(12) United States Patent
Goren et al.

(10) Patent No.: US 10,298,741 B2
(45) Date of Patent: May 21, 2019

(54) METHOD AND DEVICE FOR ASSISTING IN SAFE DRIVING OF A VEHICLE

(71) Applicant: SECURE4DRIVE COMMUNICATION LTD., Tel Aviv (IL)

(72) Inventors: Adi Goren, Jerusalem (IL); Reuven Ulmansky, Mevasseret-Zion (IL); David Cohen, Givataim (IL)

(73) Assignee: SECURE4DRIVE COMMUNICATION LTD., Tel Aviv (IL)

( * ) Notice: Subject to any disclaimer, the term of this patent is extended or adjusted under 35 U.S.C. 154(b) by 619 days.

(21) Appl. No.: 14/903,378

(22) PCT Filed: Jul. 17, 2014

(86) PCT No.: PCT/IL2014/050652
§ 371 (c)(1),
(2) Date: Jan. 7, 2016

(87) PCT Pub. No.: WO2015/008290
PCT Pub. Date: Jan. 22, 2015

(65) Prior Publication Data
US 2016/0150070 A1   May 26, 2016

Related U.S. Application Data

(60) Provisional application No. 61/847,576, filed on Jul. 18, 2013.

(51) Int. Cl.
*H04M 1/725* (2006.01)
*G06K 9/00* (2006.01)
(Continued)

(52) U.S. Cl.
CPC .... *H04M 1/72569* (2013.01); *G06K 9/00805* (2013.01); *G08G 1/0112* (2013.01); *G08G 1/096775* (2013.01); *H04M 1/72538* (2013.01); *H04M 1/72577* (2013.01); *H04W 4/029* (2018.02); *H04W 4/90* (2018.02); *H04W 48/04* (2013.01); *G08B 21/06* (2013.01); *H04W 8/18* (2013.01)

(58) Field of Classification Search
CPC combination set(s) only.
See application file for complete search history.

(56) References Cited

U.S. PATENT DOCUMENTS 7,113,867 B1   9/2006   Stein
8,493,198 B1   7/2013   Vasquez et al.
(Continued)

FOREIGN PATENT DOCUMENTS

EP   2107504 A1   10/2009

OTHER PUBLICATIONS

International Search Report of PCT/IL2014/050652 dated Jan. 7, 2015.

*Primary Examiner* — Steven S Kelley
(74) *Attorney, Agent, or Firm* — Browdy and Neimark, PLLC

(57) ABSTRACT

A method and system are disclosed for operating a communication device to assist in safe driving of a vehicle. The method includes continuously monitoring driving conditions by analyzing data obtained from one or more sensors, positioning system, and a data network, and processing the driving conditions to determine a safety level of the vehicle corresponding thereto. The method further include automatically adjusting an operational mode of the communication device, based on the determined safety level, to automatically enable, disable and/or alter predetermined functions of the communication device in accordance with the safety level.

21 Claims, 10 Drawing Sheets

(51) Int. Cl.
*G08G 1/01* (2006.01)
*H04W 4/90* (2018.01)
*H04W 4/029* (2018.01)
*H04W 48/04* (2009.01)
*G08G 1/0967* (2006.01)
*H04W 8/18* (2009.01)
*G08B 21/06* (2006.01)

(56) References Cited

U.S. PATENT DOCUMENTS

| | | | |
|---|---|---|---|
| 8,874,162 B2* | 10/2014 | Schrader | H04W 12/08 340/670 |
| 8,880,125 B2* | 11/2014 | Shyamalan | H04M 1/6091 455/404.1 |
| 8,989,820 B2* | 3/2015 | Czaja | H04W 48/04 455/456.1 |
| 9,970,774 B2* | 5/2018 | Atsmon | G01C 21/3602 |
| 2007/0154068 A1 | 7/2007 | Stein et al. | |
| 2008/0036576 A1 | 2/2008 | Stein et al. | |
| 2009/0037088 A1* | 2/2009 | Taguchi | B60W 30/095 701/117 |
| 2010/0085173 A1 | 4/2010 | Yang | |
| 2011/0009107 A1 | 1/2011 | Guba et al. | |
| 2012/0071151 A1 | 3/2012 | Abramson et al. | |
| 2012/0105639 A1 | 5/2012 | Stein et al. | |
| 2012/0158276 A1 | 6/2012 | Kim | |
| 2015/0181531 A1* | 6/2015 | Zajac | G06F 1/3212 455/574 |
| 2015/0329217 A1* | 11/2015 | Kirk | B64D 45/00 701/301 |

* cited by examiner

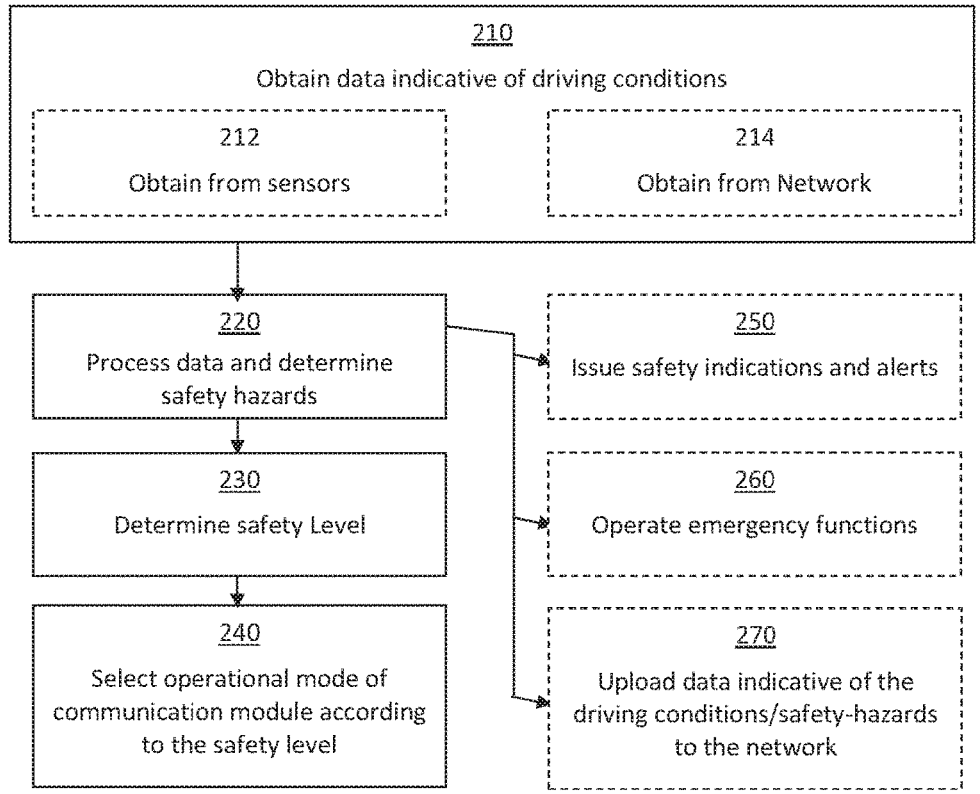

Fig. 3A

| Safety Hazard Parameter | Normal | unsafe | Hazardous |
|---|---|---|---|
| Headway Distance | Above minimal distance | Slightly below minimal distance for short periods of time | much below minimal distance |
| speed | Below, but near about the permitted speed. | Slightly above or much below the permitted speed. | much above the permitted speed |
| TTC | TTC above a first time threshold (e.g. 2.5 sec) | TTC is in between the first and second thresholds | TTC is below a second time threshold (e.g. 1.5 sec) |
| Lane Departure | Within lane | Departing lane to another lane/or turn with proper signal | Departing lane without proper signal |

Fig. 3B

| Safety Level | Condition |
|---|---|
| Safe mode | All Safety Hazards within the norm |
| Unsafe mode | one safety hazards is unsafe |
| Dangerous Mode | A plurality of safety one safety hazards are unsafe or at least one is hazardous |

Fig. 3C

| Safety Level | Display Camera Underlay | Incoming Calls | Outgoing Calls | Incoming text Msg | Outgoing Text Msg | Browsing |
|---|---|---|---|---|---|---|
| Not Driving | X | Regular | Regular | Regular | Regular | Regular |
| Safe Mode | V | Manual + voice control | voice control | Display Msg + Read Msg | Text+voice control | voice control +Display Results |
| Un Safe Mode | V | voice control only | Disabled | Read Msg | voice control + Auto complete | Disabled |
| Dangerous Mode | V | Block calls (*auto text preset message) | Disabled | Disabled | Disabled | Disabled |

Fig. 3D

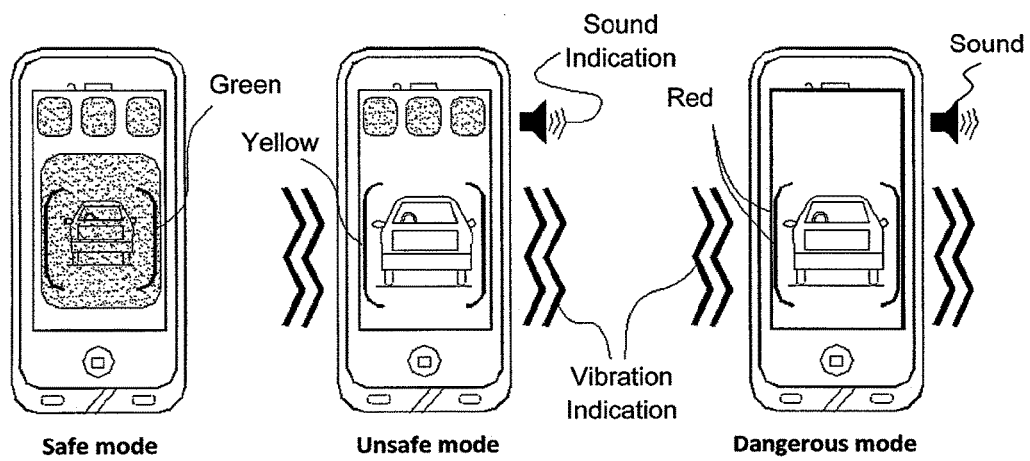

Fig. 3E

METHOD AND DEVICE FOR ASSISTING IN SAFE DRIVING OF A VEHICLE

TECHNOLOGICAL FIELD

The present invention is in the field of monitoring techniques and relates to a method and device for monitoring driving conditions assisting in safe driving of a vehicle.

BACKGROUND

In the recent years, increasing number of vehicle accidents result from driver's attention being distracted due to the use of a communication device, such as a mobile phone and/or a vehicle communication system. With the development of "smart" and easy to use communication devices, such as smartphones and tablets, many drivers are tempted to use and operate these devices during driving. For example drivers often text messages to friends or other third parties, make phone calls and/or even for browse the internet. Due to this phenomenon, there is a rise in the number of accidents resulting from driver's distraction.

Various known techniques improving driving safety, are adapted for monitoring the vehicle's environment and/or the driving and providing the driver with warnings relating to risk presenting elements/events.

For example, U.S. patent publication No. 2012105639 discloses a system mountable in a motor vehicle. The system includes a camera and a processor configured to receive image data from the camera. The camera includes a rolling shutter configured to capture the image data during a frame period and to scan and to read the image data into multiple image frames. A near infra-red illuminator may be configured to provide a near infra-red illumination cone in the field of view of the camera. The near infrared illumination oscillates with an illumination period. A synchronization mechanism may be configured to synchronize the illumination period to the frame period of the rolling shutter. The frame period may be selected so that the synchronization mechanism provides a spatial profile of the near infra-red illumination cone which may be substantially aligned vertically to a specific region, e.g. near the center of the image frame.

European patent publication No. 2,107,504 discloses a vehicle environment monitoring device and method that is based on transmitting a three-dimensional vector model generated at a vehicle to an external location. The three-dimensional vector model of the vehicle's environment is generated on the basis of the image data captured by at least a three-dimensional camera. Out of the image data, particular data are extracted for generating the three-dimensional vector model in order to reduce the data volume and thus the bandwidth requirements for transmission. Possible applications of the transmitted vector model include, but are not limited to driver assistance, external monitoring and vehicle control, as well as overall traffic monitoring and control. Preferably, a sequence of three-dimensional vector models, representing a three-dimensional space-and-time model, is generated and transmitted.

U.S. Pat. No. 7,113,867 discloses a time-to-contact estimate determination system for generating an estimate as to the time-to-contact of a vehicle moving along a roadway with an obstacle. The time-to-contact estimate determination system comprises an image receiver and a processor. The image receiver is configured to receive image information relating to a series of at least two images recorded as the vehicle moves along a roadway. The processor is configured to process the image information received by the image receiver to generate a time-to-contact estimate of the vehicle with the obstacle.

U.S. patent publication No. 2008036576 discloses a method in computerized system mounted on a vehicle including a cabin and an engine. The system including a visible (VIS) camera sensitive to visible light, the VIS camera mounted inside the cabin, wherein the VIS camera acquires consecutively in real time multiple image frames including VIS images of an object within a field of view of the VIS camera and in the environment of the vehicle. The system also including a FIR camera mounted on the vehicle in front of the engine, wherein the FIR camera acquires consecutively in real time multiple FIR image frames including FIR images of the object within a field of view of the FIR camera and in the environment of the vehicle. The FIR images and VIS images are processed simultaneously, thereby producing a detected object when the object is present in the environment.

GENERAL DESCRIPTION

There is a need in the art for a novel system and method for monitoring driving conditions and assisting in safe driving of a vehicle.

As indicated above, a prominent cause of many vehicle accidents relates to drivers distractions associated with preoccupation of vehicle drivers with their communication devices (e.g. their personal communication devices/mobile phones and/or a built in vehicle communication device). The known techniques for improving the driving safety are mainly directed to monitoring the road at which the vehicle is driven to identify risk presenting situations, and upon identifying such a situation, presenting corresponding warning notifications to the vehicle's driver to warn him of the risky situation. However, the conventional techniques for improving driver safety are lacking with regards to reducing risks that are associated with the driver's distraction and/or pre-occupation with their communication devices. As driver's distraction presents a major driving risk, some known navigation systems/applications operate to completely ban the driver's texting while driving. However in such applications, banning the texting is generally is performed in an all embracing manner, and regardless of the safety level of the driving state, thus causing the drivers to override the ban (e.g. by declaring they are not the drivers).

The present invention provides systems and methods for monitoring driving conditions and improving driving safety, for example by preventing unsafe driving by the driver. More specifically, the present invention provides a technique for monitoring and identifying safety risks/hazards during the driving, accordingly dynamically assigning/modifying a safety level value assigned to the current driving state of the vehicle (based on the identified safety hazard(s)), and dynamically adjusting the operation of certain interactive functions of the communication device based on the current safety level, so as to prevent the driver from engaging with interactive communication functions on his communication device at times where poor or dangerous safety level were estimated for the vehicle. For example at such times interactive communication functions such as texting, browsing the contact book and calling and/or browsing internet, may be banned and/or their operation altered to restrict the level of driver interaction and distraction thereby. In some embodiments of the present invention the interactive functions (e.g. communication functions) of the communication device are dynamically enabled, disabled, and/or altered when the safety level of the vehicle which is monitored, is changed. Accordingly, the technique of the invention provides improved flexibility to the driver, as it does not completely ban the use of the interactive functions of the communication device while driving, but only restricting their use at times where dangerous and/or risky situations are identified.

The technique of the present invention is particularly suitable for use in mobile/smart phones and/or other "smart communication devices" and can be implemented as a software application installable on such devices. The technique of the present invention may be adapted for exploiting the capabilities of such smart communication devices (e.g. exploiting their computation/processing power, built in sensors, communication capabilities, and user interface) to monitor driving conditions and identify risky situations (i.e. hazardous events), provide a driving assistance such as alerts/warnings and notifications to the driver, and to actively and prevent certain driving risk by dynamically adjusting the operations of certain interactive functions of the communication device in accordance with the monitored safety levels.

Certain aspects of the present invention provide a novel technique for detecting/determining distances to objects, such as vehicles, which are captured by using single camera (i.e. mono/monocular non-stereoscopic camera such as that typically equipped in mobile phones and tablets). In certain embodiments, the technique of the present invention determines a distance from the camera to an image object by estimating a distance to a plurality (two or more) elements appearing in the imaged object/vehicle. The image is thus processed to identify the object and the elements thereon. Then the distance to different elements of the objects may be determined by utilizing different techniques. For example, in case the object is a vehicle, the distance to the base line element in the object (e.g. to the lowest virtual strait line that can be drawn in the image to a pair of the vehicle wheels), may be determined by considering image perspective (e.g. which may be computed based on the focal length of the camera lens). Also a distance to elements of predetermined size on the object, such as a license plate and a pair of vehicle lights, may be determined by comparing the size of such elements in the image with their known predetermined size. Thus, the present invention provides a novel technique that may be used in mobile communication devices such as smartphones for monitoring/measuring the distance to objects captured by the camera of the device with improved accuracy. Distances measured by the technique of the invention such may be used to estimate the driving conditions and safety level of the vehicle.

In some implementations the method and system of the present invention is configured to utilize telemetric techniques to obtain data indicative of certain driving conditions/environment at which the subject vehicle operates. The system of the invention placed in the subject vehicle may be configured for utilizing the communication capabilities (e.g. of the communication device) for receiving data/information sensed/processed by other vehicles in the vicinity of the subject vehicle. This information is then processed/monitored to determine/asses safety events/risks/hazards in the vicinity of the vehicle, and assign a suitable safety level to the vehicle.

To this end, in some aspect of the invention, sensors, which are associated with and/or included in the communication device (e.g. being the mobile smartphone of the driver) are used for collecting telemetric data indicative of the driving conditions (e.g. such as the road conditions, vehicle conditions, and/or driver/passengers conditions and/or environment/conditions within the cabin), and the communication capabilities of the device are used to communicate such data directly or indirectly to relevant vehicles, which are in proximity of the subject vehicle. The relevant vehicles may be determined for example by considering three parameters: the vehicles location; their heading direction; and a time to collision (distance and speed) with the event location (e.g. being for example the location of the subject vehicle). The telemetric data may be communicated from the communication devices of one or more vehicles/drivers installed with the system of the present invention, to a central server configured according to the invention. The central server may determine relevant vehicles and communicated pieces of the relevant data thereto (while optionally processing the data from the plurality of vehicles at the server side before communication data indicative of driving conditions and/or safety hazards (i.e. risk presenting situations) obtained from the processing to the relevant vehicles).

Thus, according to certain broad aspects of the present invention there is provided a method for operating a communication device of a driver when driving a vehicle, the method includes:

Continuously monitoring driving conditions by analyzing data obtained from one or more of the following: sensors, a positioning system, and a data network (e.g. a central server);

processing data indicative of said driving conditions to determine a safety level of the vehicle corresponding to said driving conditions; and automatically (i.e. also dynamically) adjusting an operational mode of the communication device based on the safety level, to automatically enable, disable and/or alter predetermined functions of the communication device in accordance with the determined safety level.

It should be understood that in certain embodiments of the present invention the predetermined functions are communication functions, and particularly interactive communication functions, which when in normal operational mode require intensive interaction from the driver. For example, the predetermined functions which are automatically and dynamically adjusted in accordance with identified safety level of the vehicle may include at least one of the following communication functions: receiving and transferring incoming, and outgoing phone calls respectively, receiving and transferring incoming and outgoing texting messages respectively, and browsing a data network.

In particular, in normal operational mode, transferring outgoing phone calls and messages (e.g. texting), as well browsing, are highly intensive interactive functions which require drivers attention and cause hazardous distractions. Thus the mode of these operations is particularly controlled and/or adjusted to as to either ban these operations in highly dangerous situations and/or to assist the driver in performing them with reduced risk.

Other functions which may be automatically controlled/adjusted by the system of the present invention according to the safety level may include emergency function/mode in which for example automatic recording (e.g. black box recording) of the cabin environment and/or the environment outside the vehicle may be carried out and transmitted from the vehicle to external service/server. The recording may be for example performed utilizing sensors associated/included in the communication device (e.g. microphone and/or camera) when dangerous/unsafe situation/safety-level is identified. Also in such dangerous situation, an automatic panic function may be activated and/or panic button may be made to appear on the screen.

In certain embodiments of the present invention the continuous monitoring of the driving conditions associated with a vehicle includes: carrying out at least one of the following: determining a speed of the vehicle, determining a trajectory of movement of the vehicle, determining acceleration of the vehicle, determining traffic conditions along the vehicle route, determining a distance of the vehicle to at least one object along the vehicle's route.

In this connection, it should be noted that the present invention provides a novel technique for determining a distance from the vehicle to another object/vehicle. The method includes: operating a camera for capturing an image showing the another vehicle; processing the image to recognize an element on the another vehicle, which is associated with a predetermined physical size; determining a measure of the imaged size of the element in said image; and determining a distance from the camera to this element based on a focal length of the camera and a ratio between said imaged size and said predetermined physical size. For improved accuracy, this technique may be performed twice, for example once for license plate element appearing in the image of the another vehicle and second time for a pair of lights in the image of the another vehicle.

In certain embodiments of the present invention, determining of the distance to the another vehicle includes: operating a camera for capturing an image showing said another vehicle; processing the image to recognize the another vehicle and determine a location of the another vehicle (e.g. of a predetermined element/structure of the another vehicle) in the image; and estimating a distance to the another vehicle based on the determined location in the image, and a perspective of the image associated with a focal length of the camera by which said image is captured. The predetermined element/structure may be for example the base line between the wheels of the another vehicle appearing in the image and the location may relate to the height at which it appears in the image. As higher the base line appears, the further the another vehicle is from the camera. The distance measure may be determined estimated by considering the line of sight of the camera and its focal length (and/or its numerical aperture).

In another broad aspect of the present invention there is provided a communication device for assisting in safe driving of a vehicle, the communication device being preprogrammed for performing predetermined function, and being configured for receiving input data from at least one of the following: one or more sensors including at least one forward facing camera, a positioning system, and a data network; and comprising a data processor utility, and a user interface utility. The data processor utility comprising:

a driving condition module adapted for monitoring driving conditions by analyzing said input data;
  a safety hazard detection module adapted for processing data indicative of the driving conditions to determine a safety level of the vehicle corresponding to said driving conditions; and
  a communication control module adapted for automatically adjusting an operational mode of said communication device based on the safety level, to automatically enable, disable and/or alter predetermined functions of said communication device in accordance with the safety level.

In yet another broad aspect of the present invention there is provided a distributed system including at least a server (e.g. a central server being a computerized system (e.g. processor/processing-unit, memory, and a communication utility for communicating with a data network). The central server is configured and operable for communicating with at least one communication device, associated with the distributed system (e.g. being members of the system), for carrying out the following:

obtain data indicative of the driving conditions and/or safety hazards (risk presenting situations/events) identified by the at least one communication device;
  process the data identify safety hazards which may affect on vehicles in the vicinity of the at least one communication device;
  obtain positioning data from the at least one communication device, and from one or more additional communication devices associated with the distributed system, and process said positioning data to identify another communication device being in the vicinity of the at least one communication device (e.g. within a predetermined distance/range at which the identified safety hazards present risk to a vehicle of the another communication device), and;
  communicate data indicative of the above determined/identified safety hazards to the another communication device.

The distributed system thereby collects processes and distributes risk/hazard presenting telemetric data in between a plurality of vehicles at which a plurality of communication devices are respectively located. The system enables to adjust the operation of predetermined functions (e.g. interactive communication functions) of the plurality of communication devices in accordance with the safety hazards/risks and/or driving conditions identified at other vehicles, and/or notifying the vehicle driver(s) of these risk and thereby assisting the driver and improving driving safety.

According to another aspect of the present invention there is provided a server including: a memory storing data including computer readable instructions installable on a computerized communication device, wherein the computer readable instructions are adapted for operating the computerized communication device for carrying out any one or more of the methods of the present invention as described above and in more details below; and communication utility adapted for data communication with one or more computerized communication devices via a data network for uploading said computer readable instructions for installation by said one or more computerized communication devices.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3A is a flow chart 200 of a method used according to some embodiments of the present invention for operating a communication device to assist in driver's safety;

FIGS. 3B-3D are tables exemplifying the operation of the method of FIG. 3A in self explanatory manner, wherein: FIG. 3B exemplifies the manner of detection of certain types of safety hazards; FIG. 3C exemplifies how an overall safety level is determined for the vehicle from the plurality of detected safety hazards; and FIG. 3D is a lookup table exemplifying reference data used for associating different safety levels with respective enabled operational modes of various communication modules/functions of a communication device;

FIG. 3E is a self explanatory illustration of a communication device operating according to an embodiment present invention to show imagery of road conditions a head of a vehicle on a background of a display and present audio and/or visual notifications about identified safety hazards on the foreground;

DETAILED DESCRIPTION OF EMBODIMENTS

Figure 1:
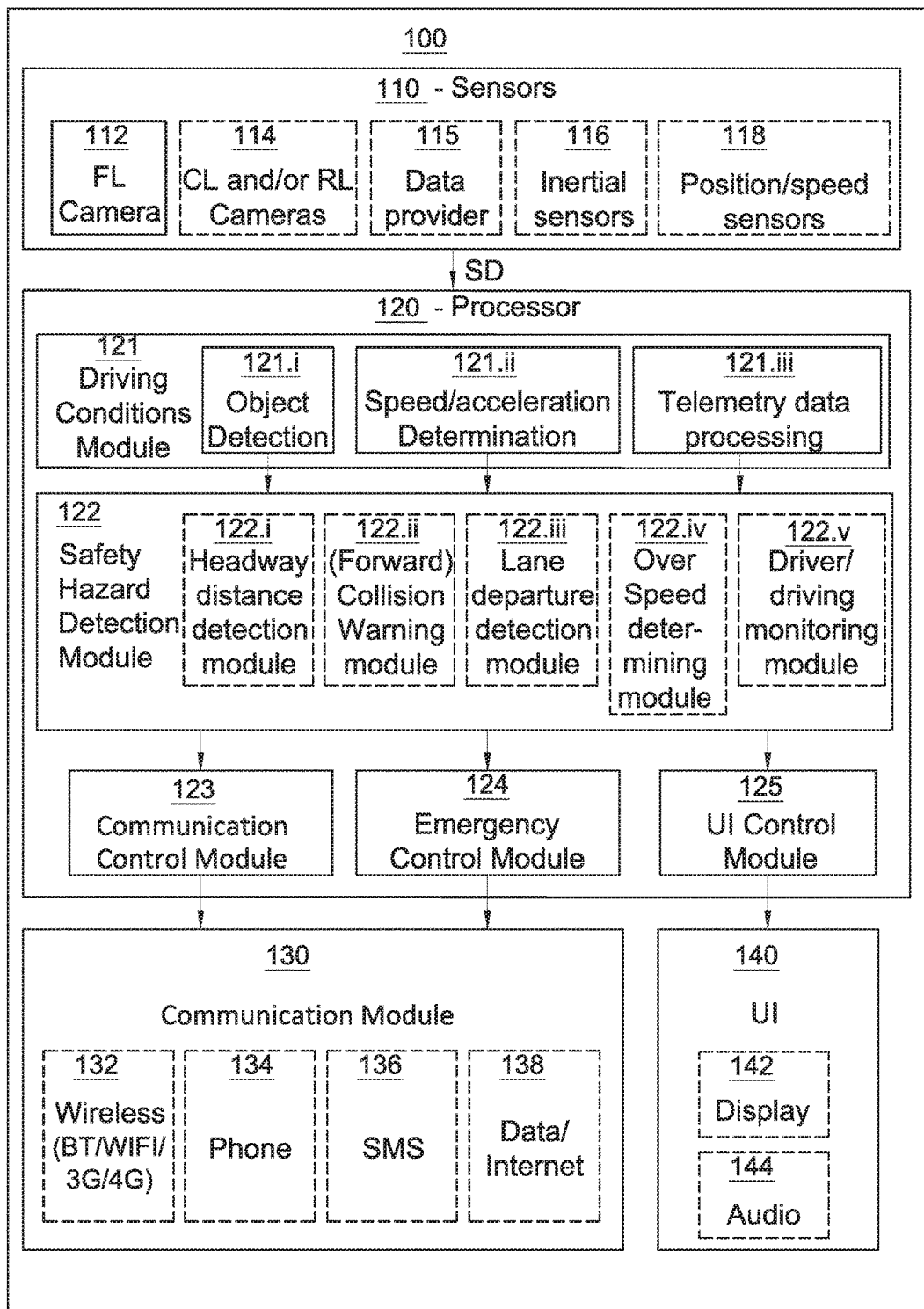
FIG. 1 is a block diagram of a communication system 100 according to an embodiment of the present invention configured and operable for assisting in safe driving of a vehicle.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide means, systems and methods to improve driving safety and provide driver assistance.

In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention.

The term 'computing device' and/or processor and/or controller and/or control system refers hereinafter to any computing device which includes a digital processor that is capable of executing hard/soft coded computer readable code/instructions. This being inclusive for example of vehicle computers, handheld/mobile devices such as phones/smartphones, tablets, laptops, as well as any other type of device which include digital processor (e.g. audio/video systems etc). It should also be noted that the term module reference herein to any part of a system and or to a complete system, such as a computing device, which is formed by any one of the following configurations or by their combinations: (i) analogue circuitry, and/or (ii) digital hardware/circuitry, and/or (iii) hardcoded software/firmware, and/or (iv) soft coded software.

The invention comprises an integrated solution for enhancing driving safety, and providing assistance to vehicle drivers. The system provides assistance and through a combination of hardware components and software that may include at camera module and possibly also additional sensors such as accelerometers, a computing module (processing unit), and communication module. The modules may be part of a single inter-vehicle communication device such as driver's phone smartphone or tablet running suitable software application or a communication device associated within the vehicle (e.g. Vehicle's computer). It should be noted that the system of the invention may be implemented in its entirety within a mobile communication device such as a Smartphone or a tablet of the vehicle driver. The system may be implemented as a software application module installed in a communication device (e.g. a car communication system and/or a mobile communication device of the driver) and including computer readable code for carrying out the methods of the invention to improve driving safety, and assist the driver during the drive. To this end the software application module may be configured and operable for utilizing various peripheral modules, such as camera, GPS, internet communication, accelerometer, microphone and/or possibly other modules associated with the communication device, to determine the driving conditions. It should be understood that these modules may be the modules of the communication device itself, and/or in some embodiments some/all of the peripheral modules may be external modules with which the software application communicates by wired or wireless communication (e.g. utilizing and operating the Bluetooth or WIFI communication capabilities of the communication device).

FIG. 1 presents an exemplary embodiment of a communication system 100 of the present invention, adapted for assisting in safe driving of a vehicle for improving driver's safety. The communication system 100 is associated with (includes or being in data communication with) one or more sensors 110 including at least one camera (e.g. Forward Looking/Facing (FL) Camera 112), and/or a positioning system, and/or a data network from which the system receives input data. The system 100 is associated with a communication module 130 (e.g. being part of a personal communication device of a driver, such as his/her mobile phone), and is configured for adjusting the operation/functions of the communication module to improve the safety driving of the vehicle.

The system 100 includes a processor 120 connectable to the sensors 110 and to the communication module 130, and typically includes a user interface utility 140. The processor 120 is adapted for receiving input data, e.g. (sensory data/signals) SD from the sensors, and processing the received data to monitor driving conditions, and determine safety hazards (i.e. determine situations/conditions/events within and/or outside the vehicle, which present driving related risk) and safety levels along/during the driving. The system uses the so-determined data to operate (enable/disable/alter) certain one or more functions of the communication module/device based on the determined safety levels so as to improve the driving safety.

As indicated above, the system 100 may be included/implemented in/as a communication device, preprogrammed for performing predetermined function(s). Accordingly, such a device may include one or more sensors (cameras) 110, and a positioning system (e.g. 118), and be connectable to a data network (e.g. via the data provider 115).

In certain embodiments of the present invention, the data processor utility 120 includes a driving condition module 121 adapted for monitoring driving conditions of the vehicle by analyzing the input data from sensors 110. The data processor utility 120 also includes a safety hazard detection module 122 adapted for receiving the driving condition data from module 121 and processing this data to determine a safety level of the vehicle corresponding to the driving conditions. Additionally, the data processor utility 120 includes a communication control module 123 adapted for automatically adjusting an operational mode of the communication device 100 based on the determined safety level, to automatically enable, disable and/or alter predetermined functions (e.g. communication functions) of the communication device in accordance with the current safety level of the vehicle.

The determined safety level may be based on the driving conditions, and may be selected from a list of several discrete levels typically including: at least one safe level, at least one dangerous level, and at least one intermediate level of a predefined degree of safety. The automatic adjustment of the operational mode may include selectively setting an operational mode of each of the predetermined functions to at least one of the following modes: fully enabled mode, fully disabled mode, voice control mode, read-aloud notification mode; auto-reply mode; emergency action mode. These are described below in more details.

As indicated above, in certain embodiments, the communication device/system 100 is configured as a personal communication device of the driver. The construction of such a personal communication device used by drivers is known per se: the device includes built-in sensors such as a camera, a positioning system, an inertial sensing system; a data provider module for receiving data from a data network; a memory, and a data processor unit. According to the invention, the communication system may be implemented as a software product installable in such personal communication device, e.g. downloadable from the network. Thus, the communication system of the invention may be implemented as computer readable code storable in the memory of a personal communication device or the like (e.g. vehicle's computer) and capable of implementing the driving condition module, the safety hazard detection module, and the communication control module.

Figure 3F:
FIG. 3F is a self explanatory illustration of a technique for emphasizing an object, which presents a driving safety hazard, by applying of warping to an image showing the object.

The invention may thus be implemented by a computer readable instructions/code implementing the driving condition module, the safety hazard detection module, and the communication control module, as described herein, and possibly also additional modules. Alternatively or additionally, the present invention may be implemented by a computer readable instructions/code for causing a processing unit (e.g. of a personal communication device) to implement the method of the invention, e.g. as exemplified by a flow diagram 200 described below with reference to FIG. 3A.

Thus, the communication system/device 100 may be configured or form part of one of the following: a mobile phone device, a phone device installed in the vehicle, and a communication device integral with a vehicle's computer.

The communication module 130 is typically configured to provide predetermined communication capabilities/functions, e.g. based on GSM 3G and/or 4G protocols/networks, WiFi/WLan protocols/networks, Bluetooth (BT) protocols/networks and/or any other suitable wireless communication protocol/networks. The predetermined functions may include at least one of the following: receiving and transferring incoming and outgoing phone calls respectively, receiving and transferring incoming and outgoing messages respectively (such as text messages, multi-media messages, etc.), and browsing a data network. To this end, the communication module 130 includes one or more of the modules/applications: phone module/application 134, Short Message (SMS) module/application 136, and/or data/internet module/application 136 which provide the user with respective phone call/SMS and/or data/internet communication functionalities.

According to some embodiments of the invention, the processor 120 is configured and operable to obtain the sensory data/signals SD from the sensors 110, and process the sensory data/signals SD to determine at least one of the following driving safety hazards, and possibly other driving safety hazards, which are not specifically listed herein:

(i) short headway distance—when the distance between the driving vehicle to another vehicle in front of becomes shorter than the minimal acceptable distance between vehicles (typically 2-3 seconds of driving).

(ii) Short time to collision—when the vehicle is expected to collide with another object within a time frame shorter than a certain limit (iii) Lane departure—when the vehicle's path unexpectedly starts to depart from the lane (e.g. without activation the turn light signal and/or otherwise without indication to the drivers attention to such departure).

(iv) Over Speeding—when the vehicle is driven at a speed that is higher and/or possibly significantly lower than the permitted by the traffic speed limit (v) Driver's distractions and/or driving behavior related safety hazards.

(vi) Telemetry detected safety hazards/events

To this end, the processor 120 includes software and/or hardware modules 121 and 122, which are configured and operable, respectively, for processing at least some portions of the sensory data/signals SD and determining driving conditions, and for analyzing the driving conditions data to detect one or more of the safety hazards (i) to (vi) above. In this connection it should be understood that the above listed safety hazard detection operations (i) to (vi) may be implemented using any suitable data processing technique, and may utilize any required sensory data input for this purpose.

Indeed, the present invention in some of its embodiments also provides novel techniques for implementing at least some safety detection operations. For example, as indicated above and discussed below in more details with references to FIGS. 4A-5, the present invention also provides novel methods and systems for determining heading distance towards another vehicle, optionally based on input from a single/mono camera input.

In some embodiments of the present invention, the one or more sensors 110 include at least one forward looking (FL) camera 112 (e.g. single/mono camera) directed towards the general driving direction of the vehicle. Optionally, the sensors 110 may include one or more additional cameras. These may be cameras having different field of views and/or different wavelength ranges. For example, these may be two FL cameras operating in the visible and IR regimes for improved night vision, and/or additional cameras 114 looking at other regions/directions, e.g. cabin looking (CL) camera positioned to face the interior of the cabin so as to enable detection irregular driver behavior (e.g. sleep). Also, this may be rear/side looking (RL) camera(s), facing the rear and/or sides exterior of the vehicle for detection of rear/side events. It should be noted that in certain embodiments of the present invention, where the system of the invention is implemented/integrated with a mobile communication device, such as a smartphone or tablet, the primary/back camera of such communication device may serve as the FL camera discussed above, and the front (chat) camera of the communication device may be used as the CL camera. Hence, the communication device/smartphone may serve as a platform to the system 100 of the present invention, by executing suitable computer readable code (e.g. downloadable software application) implementing the modules/methods of the system 100 described above and in more details below. The communication device/smartphone may be placed on a dedicated mount in the vehicle such that its back camera faces the road in front of the vehicle (e.g. faces the general driving direction) and its front camera faces the cabin.

As indicated above, sensors 110, providing input data to the system of the invention, may also optionally include a data provider module 115, for providing communication of the system of the invention with external systems/utilities, to obtain data to be used by the system to identify the driving conditions of the vehicle.

For example, the data provider module 115 may be adapted to connect (via wired or wireless communication/network) to the vehicle's computer, and/or to a central/dedicated server (e.g. to dedicated traffic/vehicle monitoring servers/services) to obtain therefrom telemetry data indicative of driving condition of the vehicle. For example the telemetry data may include data that was remotely measured by other vehicles, and that was identified (e.g. by the central server) as being relevant to the present vehicle. This feature of the invention is described for example in more details below, with reference to FIG. 2A to 2C.

Sensors 110 may also optionally include inertial sensors 116, such as accelerometers and gyros, adapted for measuring and providing data/signal indicative of the vehicle's acceleration and rotation rates. Additionally or alternatively, the sensors 110 may include a positioning systems 118, which may be satellite based positioning systems (e.g. GPS based), positioning systems based on cellular network, and/or positioning systems, which utilize data from the inertial sensors 116 to estimate the position of the vehicle.

As shown in the figures, the processor 120 includes a driving condition monitoring module 121 that is configured and operable for receiving the data SD from the sensors 110 (e.g. raw sensory data and possibly including data provided from the network via the data provided module 115). The driving condition module 120 may be adapted for determining one or more from the following: a speed of the vehicle, a trajectory of movement of the vehicle, acceleration of the vehicle, traffic conditions along the vehicle route, a distance of the vehicle to at least one object along the vehicle's route. The driving condition module 120 may be adapted to determine one or more of the following parameters/data indicative of the driving conditions: (a) it may be adapted to determine/detect/recognize objects located in the vicinity of the vehicle; (b) determine/estimate the speed/acceleration of the vehicle; (c) optionally process the data to determine additional driving parameters/conditions as discussed in the following.

For example, the driving condition monitoring module 121 may include an object detection module 121.i adapted for receiving sensory data (e.g. image data) from at least one camera 112 and/or 114 described above, and processing the image data to detect objects in the image. For example, the object detection module 121.i may operate to process the image data utilizing suitable image/pattern recognition technique(s) to detect predetermined objects within the image, such as other vehicles, pedestrians, bicycles, traffic signs, lane markings and/or other objects which may be significant for the driving condition. Such techniques are known per se and, by themselves, do not form part of the invention, and therefore need not be specifically described in details, except to note the following. The object detection module 121.i may include and/or be associated with object database including pattern/object recognition data on a plurality of predetermined objects, and perform image recognition or based on this data to detect the objects. A person of ordinary skill in the art will readily appreciate specific image recognition systems and methods which can be used in the present invention to detect/recognize objects within images.

Also, the object detection module 121.i may be adapted to determine distance to certain objects it recognizes or to all of the recognized objects. In certain embodiments object detection module 121.i is adapted to detect and obtain/estimate a distance, and/or relative position between the vehicle and certain objects of predetermined types which may include other vehicles, or parts thereof (e.g. license plates/lights), pedestrians, & traffic signs).

In some embodiments, as will be further described below with reference to FIGS. 4A-5, the invention provides a novel method and system for determining/estimating the relative position between the vehicle at which system 100 is placed/installed and another vehicle/object. Specifically, this technique of the invention may be used to estimate a distance to another vehicle based on data from a single mono camera.

Alternatively or additionally, object detection module 121.i may be adapted to determine a distance to other vehicles by utilizing a stereoscopic technique using a pair of cameras (e.g. front looking cameras which in such cases should be included in sensors 110), operating stereoscopic object distance detection techniques to determine a distance to the other vehicle. It should be noted that as this technique would involve stereoscopic imaging (e.g. sensors 110 include a stereoscopic pair of FL cameras), and stereoscopic processing, in some embodiments of the present invention where use of stereoscopic camera are not desirable/available, other techniques for measuring distance and particularly inter-vehicle distance, can be used.

The driving condition monitoring module 121 may include speed/acceleration determination module 121.ii, which may utilize in-vehicle speed measurement systems (e.g. mechanical/electric vehicle sensors which data can be acquired for example by the data provider 115 from the vehicle's), and/or data obtained from any of the sensors 112, 114 116, and/or 118 to determine/estimate the vehicle's speed. Also, alternatively or additionally, speed/acceleration determination module 121.ii may be adapted to obtain data on the linear and rotational accelerations to which the vehicle is driven (e.g. by acquiring data/signals indicative of such accelerations form the inertial sensors 116). Optionally, the speed/acceleration determination module 121.ii may process the speed and/or acceleration data to determine whether the vehicle is driven safely (e.g. with calm and law obedient driving) or whether it is driven recklessly.

The driving condition monitoring module 121 may include one or more additional modules, such as the telemetry module 121.iii that is adapted for monitoring additional information/driving parameters, which impact the driving condition state. For example, module 121.iii may be adapted for receiving telemetry data from data provider 115 (e.g. from the network), and processing that data to determine the road and/or traffic conditions and/or the traffic rules (e.g. speed limits, etc) at the current location/zone of the vehicle. For example, the data provider may acquire data from a central station (server system) over the network, indicating hazardous events down the road along the route of the vehicle (e.g. a traffic jam, stacked vehicle, accident, flood, etc'). Also, this data may be acquired from over the Internet and may in some cases be based on data received from other drivers/vehicles using systems similar to the system 100 used/installed in those vehicles.

The safety hazard detection module 122 is adapted for processing the driving condition data/parameters determined/estimated by module 121 to carry out one or more of the safety hazard detection operations (i) to (vi) indicated above. In the following, there are provided some specific not limiting examples of the technique of the invention for implementing one or more of the safety hazard detection operations (i) to (vi). It should be understood that these techniques are provided only as example and that in various embodiments of the present invention these safety detection operations may be performed by other techniques and/or by utilizing different sensory input data (possibly from different set of sensors/cameras). For clarity, in the following description, separate sub modules 122.i to 122.v are used for performing the safety hazard detection operations (i) to (v) respectively. It should, however, be understood that these operations may generally be performed by a single data processor utility or by one or more other data processors, and that the particular configuration described below is provided only as an example.

For example, the headway distance detection module 122.i may be adapted to receive data indicative of the object recognized by the object detection module 121.i and data indicative of the speed/velocity of the vehicle (e.g. from the speed/acceleration determination module 121.ii). The data from the object detection module may for example include data indicative of the types of recognized objects and the locations at which they appear in one or more images captured by one or more cameras. The headway distance detection module 122 may process that data to estimate distances from the vehicle to other objects (e.g. to other vehicles and/or to pedestrians). Then, the headway distance detection module 122 may utilize the estimated distances and the data indicative of the speed/velocity of the vehicle, and determine the headway distance to other objects/vehicle and also determine whether a safe headway distance is kept between the vehicle and other vehicles/objects nearby in accordance with the prescribed minimal distance. In this regards, the minimal safe distance to be kept from other vehicles that are driving a head of the vehicle in the same lane typically equals to the distance the vehicle would travel in its given driving speed during predetermined time duration of about 2-3 seconds. In certain embodiments of the present invention, in case the headway distance to predefined objects (vehicle, individual, et.) is below the minimal safe distance the headway distance, the detection module 122 issues a warning signal (e.g. short headway distance indication).

It should be noted that certain aspects of the present invention provide a novel technique to measure/estimate a distance to another object, in particular vehicle, based on an image of the object captured by at least one camera (e.g. utilizing single mono (non-stereoscopic) camera). These systems and methods, which may be implemented by the safety hazard detection module of the present invention are specifically suited for use when system 100 is integral (e.g. in its entirety) in a mobile communication device (Smartphone/tablet), equipped with only a single FL camera. These techniques are described below with relation to FIG. 4A to 5.

The safety hazard detection module 122 may also include a collision warning module 122.ii, configured and operable for estimating the time to collision of the vehicle with other objects/vehicles. To this end, by determining the distances to objects identified by the object detection module 121.i and monitoring the change in these distances, the relative speeds between the vehicle and the identified objects may be determined/estimated, and accordingly times to collision (TTCs) between the vehicle and the other objects can be calculated. In certain embodiments of the present invention, the collision warning module 122.ii issues a warning signal (e.g. short TTC warning) in case the TTC between the vehicle and another object is below a certain predetermined value. Alternatively or additionally, in certain embodiments a short TTC warning signal is issued in cases where a ratio between the relative speed to an object and the absolute speed of the vehicle/object exceeds a certain value.

The safety hazard detection module 122 may also include a lane departure detection module 122.iii. The lane departure detection module 122.iii may generally utilize various technique of pattern recognition/image processing to process images the captured by the camera (e.g. 112 and/or 114), detect the lane at which the vehicle is driven, and determine/utilize data indicative of the course/trajectory of the vehicle to identify whether the vehicle's course departs from the lane. For example, the lane departure detection module 122.iii may be adapted to receive data indicative of "lane" objects recognized by the object detection module 121.i and utilize data indicative of the velocity of the vehicle (e.g. obtained from the speed/acceleration determination module 121.i) to estimate the course/trajectory of the vehicle (e.g. utilizing first order estimation based on the velocity and/or a second order estimation based on both velocity and acceleration), and determine whether the vehicle's estimated course departs from the recognized lane, and if so, possibly issue a lane departure warning indication/signal.

It should be noted that in certain embodiments the lane departure detection module 122.iii may be adapted to obtain (e.g. from the driving condition module 121 and/or directly from the vehicle's computer) data which may be indicative of whether the driver of the vehicle is aware of the lane departure. For example, data indicating whether the side lights of the vehicle are activated may be used to assess whether the lane departure is intentionally made by the driver, and in such cases the lane departure warning indication may not be issued and/or may be suppressed.

The safety hazard detection module 122 may also include an over speed determination module 122.iv, that is adapted to obtain data indicative of the vehicle's speed and data indicative of the allowed speed for the vehicle (e.g. from, respectively, modules 121.ii and 121.iii of the driving conditions module 121). The over speed determination module 122.iv may be adapted to issue an over/under speed warning indication, for example in cases where the vehicle's speed is above the allowed speed by a certain factor (e.g. 10% higher than the allowed), and/or in cases where the vehicle' speed is below the allowed speed by a certain factor (e.g. 20% lower than the allowed), and/or in cases where the vehicle's speed is above/below the allowed speed by a certain predetermined values (e.g. by 5 Km/H).

The safety hazard detection module 122 may also include a driver monitoring module 122.v for detecting driver's distraction related safety hazards. The driver monitoring module 122.v may thus be configured and operable for monitoring parameters of the driver and/or the driver's environment within the cabin and processing these parameters to determine the level of distraction of the driver, and thereby estimate the associated safety hazard level. The driver monitoring module 122.v is configured and operable to obtain from the driving condition module 121, or from the sensors 110, data indicative of the driver's behavior, and analyze this data to estimate the driver's distraction level and whether the driver's behavior/environment presents a driver distraction hazard associated with a certain safety level.

For example, in certain embodiments, imagery from a cabin looking (CL) camera 114 associated with the communication device 100, may be used to monitor the driver behavior. For example, the object detection module 121.i, and/or other pattern/face/body recognition module may be used to process the image and estimate/evaluate various parameters of the driver's behavior. For example, driver's fatigue may be identified by recognizing certain symptoms such as "heavy" eye leads and/or laid back sitting posture. Also for example, cases where the driver is pre-occupied, distracted and/or not concentrated on the driving, may be recognized by monitoring the driver's posture and identifying abnormal activity (e.g. high rate/frequency of posture changes above a predetermined limit), and/or by monitoring the driver's looking direction (e.g. his line of sight) and identifying whether the driver looks at directions other than the driving direction with high frequency or for long durations exceeding certain predetermined limits (e.g. the limit(s) may defined by formula and/or by fixed values). Moreover, inputs from additional sensors such as a microphone, and/or from the communication system itself, may be used to identify the level of distractions of the driver, for example by monitoring the sound/noise volume level in the vehicle, monitoring how much time or the fraction of time the driver invests in interacting with the communication system and/or monitoring other parameters of the driver and/or the driver's environment within the cabin.

Also, alternatively or additionally, module 122.v may be adapted to assess the driver's driving behavior and determine whether the driving can be classified as safe. To this end, the driver monitoring module 122.v may be configured and operable to obtain data related to the driving behavior of the driver from the driving condition module 121 and/or from the sensors 110. The data relating to the driving behavior may include data indicative of the level of linear acceleration and/or rotational acceleration and/or nominal speed of the vehicle (e.g. which may be obtained from the speed/acceleration determination module 121.ii), the traffic conditions in the region/vicinity of the vehicle (e.g. the average speed of other vehicles along the route of the driver) that may be obtained from the data network/internet (e.g. by utilizing the data provided module 115). The driver monitoring module 122.v may be configured and operable to process these parameters to determine whether the vehicle is driven safely (e.g. with calm and law obedient driving) or whether it is driven recklessly, and associate a level of safety to the driver's driving style.

Thus generally, the safety hazard detection module 122 is configured and operable for processing the driving conditions, obtained from module 121 to determine the existence of one or more safety hazards (e.g. (i) to (vi) above), and issue respective warning indications/signals indicative of the identified hazards. The warning indications may include data/encapsulate information indicative of the time of warning (e.g. short headway distance, short TTC, lane departure, speed etc), may include data indicating the identified object with respect to which the warning is issued (where applicable), and may include quantitative and/or qualitative data indicating the warning severity. It should be understood that output data corresponding to the warning indications may be presented on the user interface as visual and/or audio and/or mechanical signals/triggers.

In certain embodiments of the present invention the safety hazard detection module 122 is further adapted to process the warning indications that are in effect in a given time frame to determine a general safety level score for the vehicle. For example, the general safety score may include four discrete levels: NON-DRIVING; SAFE; UNSAFE; DENGAROUSE. The first level relates to the state where the vehicle is not being driven, while the other states relate to a driving state. An example of how these safety levels may be determined from the plurality of the warning indications is described for example in self explanatory manner in FIG. 3C. As indicated above, system 100 includes a communication control module 123 which is connected and adapted to control/adjust the operation of one or more communication modules 130 (e.g. 132-138) of the system 100, based on the determined safety level. To this end, at any given time the communication control module 123 may automatically adjust to operation mode of the device in which only those predetermined communication functions which operation can be safely performed under a given safety level of the vehicle are allowed (enabled).

In this connection, the communication control module 123 may include or utilize reference data, e.g. in the form of a lookup table (LUT), associating the safety levels with respective enabled operational modes for various communication modules/functions 130. For example, such a LUT is shown in self explanatory manner in FIG. 3D. The LUT which may be stored in a memory of the system 100 may be fixed (e.g. hardcoded/predetermined in advance) or it may be configurable by the driver/user of the system.

In certain embodiments of the present invention, the system includes a UI control module 125 that is typically connected directly or indirectly to one or more user interface (UI) modules associated with the communication device 100 (e.g. screen/speakers) and adapted for controlling the operation of one or more of the UI modules so as to assist/enhance the driving safety.

The UI control module 125 may be adapted for processing the safety levels and/or the warning indications (e.g. the short headway distance warning indication, short TTC warning indication, lane departure warning indication, speed warning indication, etc) issued by the safety hazard detection module 122, and operate the UI to present and/or emphasize certain safety hazards to the user/driver, to draw the driver's attention to those hazards.

For example, UI control module 125 may be configured and operable for performing automatic adjustment of the operation of the UI based on the safety level determined by the safety hazard detection module 122, and/or the functions enabled by communication control module.

Figure 3G:
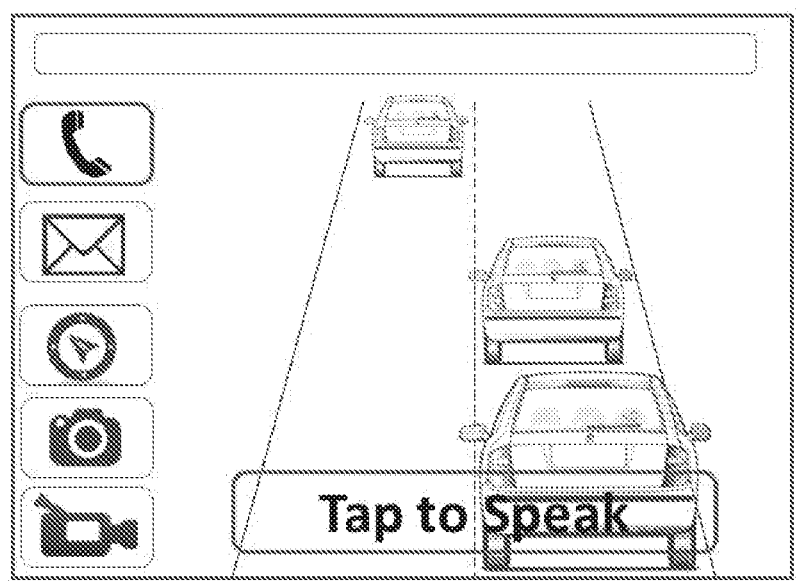
FIG. 3G is a self explanatory illustration of a user interface display according to an embodiments of the present invention in which imagery of road conditions a head of a vehicle are displayed as background, and overplayed with foreground presentation of communication functions that are enabled by the safety level assigned to the vehicle.

Upon determining that the safety level corresponds to a driving condition/state of the vehicle (e.g. in any of the above described safety levels except the NON-DRIVING state safety level), the UI control module 125 may operate to presenting imagery from at least one camera (particularly from the FL camera when driving forwards) on a display module 142 of the user interface 140. In certain embodiments, the imagery is presented in the background of the display. In certain embodiments, the UI control module 125 operates to present at least the communication functions that are enabled by the communication control module 123 on the foreground (e.g. utilizing respective icons displayed with semi transparent opacity on the imagery background), i.e. augmented image. In certain embodiments, the functions that are disabled are not presented and/or hidden. In certain embodiments, the icons of the enabled functions are presented with enlarged scale when the safety level corresponds to a driving state of the vehicle. This is illustrated in a self explanatory manner in FIG. 3G.

In certain embodiments, the UI control module 125 I is configured and operable for presenting safety warnings alerts to the driver via the UI modules 140 (e.g. via the display and/or the audio system). The UI control module 125 may be adapted for processing the warning indications issued by the safety hazard detection module 122 (e.g. the short headway distance warning indication, short TTC warning indication, lane departure warning indication, speed warning indication, etc), and determine (possibly based on the quantitative and/or qualitative data indicating the warning severity) alerts that should be presented to the user in relation to any one or more of the warning indications.

It should be noted that alerts associated with different safety hazards may be presented to the user in essentially different ways.

For example, in certain embodiments of the present invention, the UI control module 125 operates to present alerts associated with short headway distance and/or short TTC indications by emphasizing/marking the object, being the subject of those indications, on the background imagery that is shown on the display, and/or by utilizing sound/vibration indications.

This is exemplified in self explanatory manner in FIG. 3E. For example, in SAFE safety level the object presenting the imaged object/vehicle that is in front of the vehicle at which the system resides, may be marked with calm/cool color (e.g. blue/green) or not marked at all. In moderately UNSAFE safety level, the object may be marked with intermediate/warmer color, and possibly also sound or vibration may indications may be activated. In DANGEROUS safety level, worm possibly flashing indication as well as annoying sound indications may be used.

To this end alerts and/or warning indications/signals may be communicated to the driver utilizing various techniques, such as:

Visual: for example by using either a three colors phone screen frames (i.e. green=safe, yellow=unsafe, red=dangerous) and a three colors object frames (i.e. vehicle or pedestrian in front may be automatically marked by the software of the invention).

Audible: for example, a user may select from at least two types of audible warnings—a predefined "beep" for each warning (collision, lane departure etc.); Predefined recorded message for each warning (i.e. "keep distance" or "pedestrian ahead").

Physical: for example, vibration.

Alternatively or additionally, in certain embodiments of the present invention, the UI control module 125 operates to present alerts that are associated with short headway distance and/or short TTC to the vehicle in front, by emphasizing the object being the subject of the alert in the image presentation. This is exemplified in FIG. 3F. Such emphasizing may be performed by applying a warping image processing to the imagery presented on the background of the display so as to enlarge/decrees the size of the object/vehicle in the presented image in accordance with the deviation of the TTC/headway distance from the normal values. This may be achieved for example by utilizing the "magnifying glass" image processing effect on the region at which the object being the subject of the warning indication is located.

In certain embodiments of the present invention, the communication device/system 100 includes an emergency control module 124 that is configured and operable to obtain from the driving conditions module 121 and/or the safety hazard detection module 122, data indicative of the driving conditions and/or the safety level associated with the vehicle and processing that data to determine/identify emergency state of the vehicle/driver, when such state occurs. Upon determining an emergency state, the emergency control module 124 is configured for operating the communication device 100 in an emergency action mode, by carrying out at least one of the following:

transferring the data indicative of driving conditions to a central station;

transferring image/sensor data obtained from at least one sensor (e.g. camera) of the sensors 110, to a central station (which may or may not be the same); and initiating an emergency notification communication to the same or different central station.

Figure 2A:
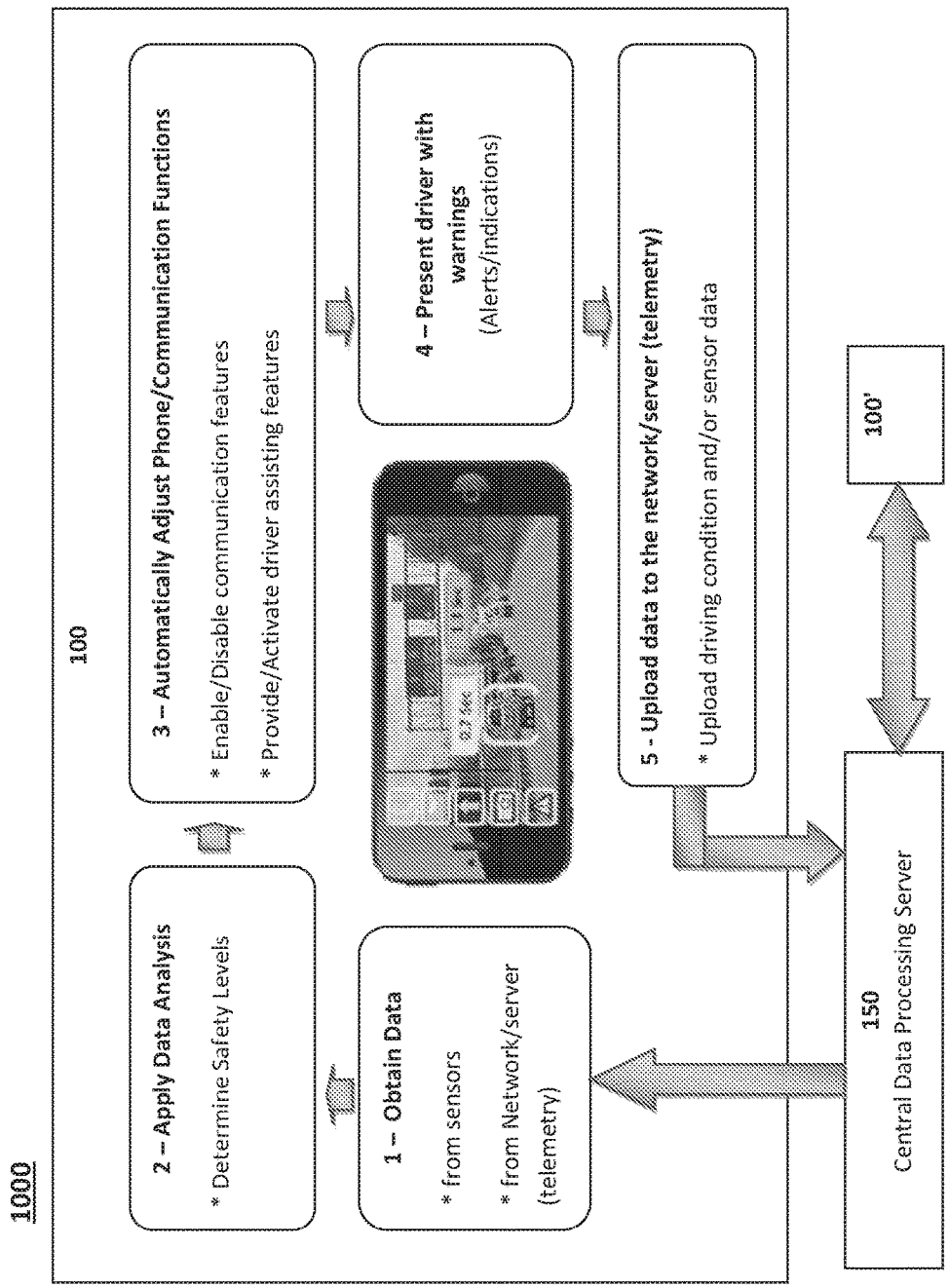
FIG. 2A schematically illustrates a distributed system, including a central server and a plurality of communication devices, and adapted for monitoring driving conditions and assisting in safe driving of vehicles.

Turning now to FIG. 2A, there is schematically shown a system 1000 of the invention configured as a so-called distributed system for monitoring driving conditions and assisting in safe driving of vehicles. The distributed system 1000 includes a central server 150, and a plurality of communication devices 100, 100' configured for example as described above with reference to FIG. 1. FIG. 2A shows in a self explanatory manner the operation of the device 100 of the present invention and its communication with the central server/station 150 of the distributed system 1000.

In this example, the device 100 is implemented on a Smartphone communication device/platform. The Smartphone may be placed on a suitable mount in the vehicle and the elements of the communication device 100, which may be in the form of an application software installed therein, are activated. In 1, the device 100 operates to obtain data from the sensors of the Smartphone and/or obtained/downloaded via a data network from the central server 150. The data may for example be obtained by utilizing the wireless communication module 132 (e.g. which may include GSM (3G/4G) and/or WIFI and/or Bluetooth communication module/protocols/modems). In 2, the device 100 operates to process this data to determine the driving conditions and the safety levels associated therewith, as indicated above. In 3, the operation of communication modules/applications of the communication device/Smartphone are adjusted to enable/ disable/alter the operations of certain functions of the Smartphone, in accordance with the determined safety level. In 4, warnings and indications associated with certain driving conditions and/or certain safety levels are presented to the driver. In some embodiments the system may comprise visual, audio and physical warning signals. To this end, warnings may be presented visually on the display of the Smartphone, and/or via other means such as sound and vibration means. In 5, driving conditions data from the driving conditions module 121, and or data from the sensors 110, and/or data from the hazard detection module 122 may be uploaded via the data network to the central server 150. The data may be uploaded for example by utilizing the wireless communication module 132.

Thus, in certain embodiments the present invention provides a Smartphone or other personal communication device, being a part of the distributed communication system 1000 (including a plurality of such communication devices 100 and central server 150). Such Smartphone is thus configured and operable for data exchange with respect to driving-related information and selectively allow (enable/disable/alter) various Smartphone device' functions, thereby monitoring driving conditions and assisting in safe driving of vehicles. The server 150 is typically associated with, or includes one, or more data communication utilities that are capable of communicating with the communication devices 100 of the present invention over a data network, to receive from the communication devices 100 data indicative of the driving conditions and/or safety hazards at the vicinity of the vehicles they reside at, and to provide the communication devices 100 with data associated with the driving conditions and/or safety hazards detected by other communication devices 100 which are located close thereto. In this regards, the central server 150 typically includes a computerized system (e.g. processor/processing-unit and memory) and hard/soft-coded computer readable instructions for carrying out the following for each communication device 100 that is in active driving state/mode and communicates with the central server 150:

communicating with the communication device 100 to obtain data indicative of the driving conditions and/or safety hazards identified thereby, and possibly also other sensory data;

processing the driving conditions and/or safety hazards and/or sensory data from the communication device 100, to determine the effects/risks these driving conditions and/or safety hazards may have on other vehicles (for example to determine the distance/range extent at which risk to other vehicles is presented by these reported safety hazards/driving conditions);

utilize positioning data of communication device 100 associated with the distributed system 1000 to identify other communication devices 100' which are located nearby the communication device 100 within the above determined distance/range extent, and communicating data indicative of the above determined risks thereto.

Thus, the distributed system 1000 is configured and operable for assisting in safe driving of vehicles by communicating with the plurality of in-vehicle communication devices 100, which may be the personal communication devices/smartphones of the vehicles' drivers, obtaining and assessing driving conditions and/or safety hazard data recognized by one or more of these communication devices, and reporting data indicative of the relevant driving conditions/safety hazards to other communication devices that are in the vicinity of the communication device from which the hazardous conditions were reported.

Figure 2B:
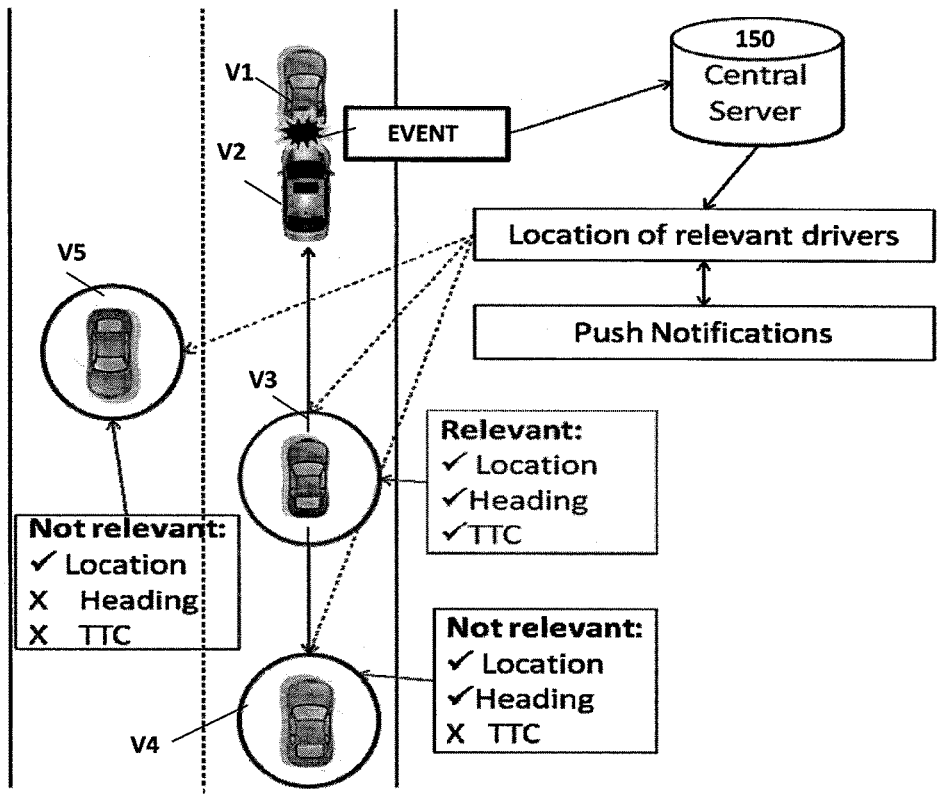
FIGS. 2B and 2C are schematic illustrations of a telemetric method for monitoring driving conditions according to some embodiments of the present invention.
Figure 2C:
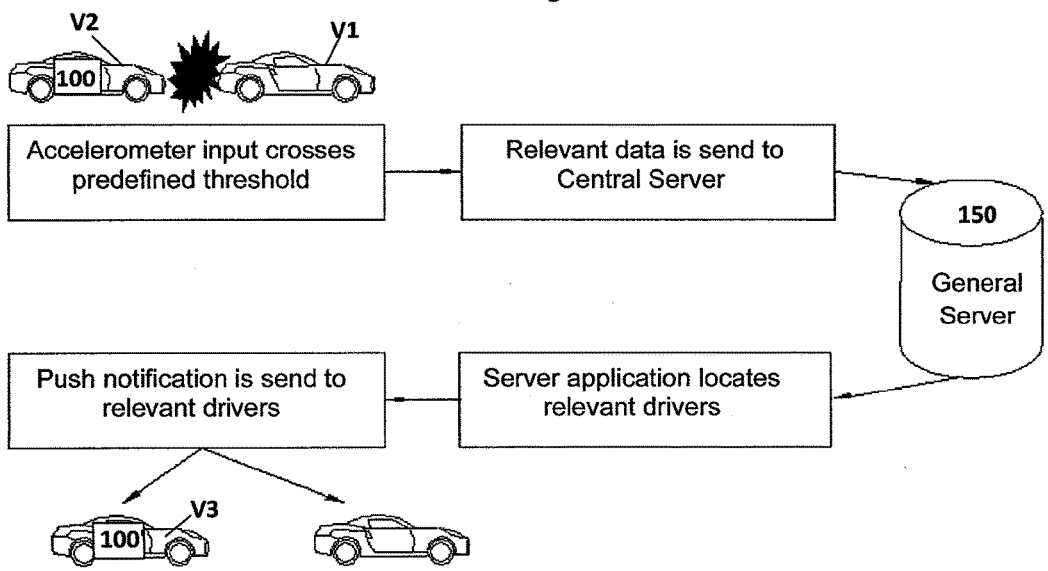

Reference is now made together to FIGS. 2B to 2C schematically illustrating a telemetric method implemented by system 1000 in some embodiments of the present invention. Here system 1000 is configured for carrying out telemetry (e.g. remote sensing/measurement and identification) of driving conditions and/or safety events/hazards by utilizing the plurality of communication devices 100 which are located at plurality of vehicles, and communicated with the central server 150.

In the present example, vehicles V1 to V5 illustrated in FIG. 2B are each equipped with a communication device 100 configured and operable similarly to the device 100 described above with reference to FIG. 1. The plurality of devices 100 in the respective vehicles V1 to V5 are adapted/preprogrammed to perform telemetry by automatically collecting/measuring and possibly also analyze data relating to the driving conditions and/or safety hazards detected near their respective vehicles and communicated that data to the central server 150.

The telemetric data which is measured/collected and/or analyzed by the devices 100 and transmitted to the central server 150 may include any of the above described data collected by the sensors 110, and/or any of the above described driving conditions and/or safety hazard related data determined by modules 121 and 122 as described above. For example as illustrated in FIG. 2C, a collision between vehicles V1 and V2 is sensed by at least one of the accelerometers of devices 100 and/or 100' that may be respectively located at the vehicles V1 and V2. The accelerometer readings are processed for example by device 100 of vehicle V1, and upon detecting that the acceleration has exceeded a certain predetermined threshold, the occurrence of a safety hazard, being an accident event, is determined/assessed and relevant data (such as the reading of the accelerometers and/or other sensors/cameras, as well as the location of the vehicle V1), is sent/transmitted to the central server 150. The central server 150, may receive the data from device 100 of vehicle V1, and also from other devices of the present invention, which may reside at other vehicles that are located near the safety hazard (e.g. the accident event in this case), such as the device 100' of vehicle V2.

The central server 150 may utilize/process the telemetry data from the plurality of vehicles (plurality of devices 100) to estimate a magnitude of the safety event, and/or a degree of severity of the safety hazard it presents, and/or its impact distance (namely to what distance the event has an effect/impact on the driving conditions) and utilize that data to determine which drivers/vehicles should driver's be notified about the event. Then server 150 operates to determine relevant drivers/vehicles which are expected to be affected by the safety event, and provides notifications of the event to the relevant drivers. For example, considering the cases the drivers of each of the vehicles V3, V4 and V5 illustrated in FIG. 2B, are equipped with devices 100 of the present invention installed on their personal communication devices. The central server 150 obtains data indicative of the location of vehicles/drivers which are equipped with devices 100 associated with the central server 150, and identifies relevant vehicles, such as V3, V4 and V5, which are located in the vicinity of the event (e.g. vehicles located within a predetermined threshold distance from the accident event between vehicles V1 and V2). The central server 150 notifies the drivers of the relevant vehicles about the safety event. Notification may be performed/communicated for example by utilizing push technique to transmit notifications to the device 100 (e.g. to the data provider module 115 of the device 100).

In some embodiments of the server determines the relevant vehicles/drivers by also considering, in addition to the locations of the vehicles, also their heading directions, and their time to collision with the event, and filtering out non relevant vehicles which are not headed towards the event and/or which TTC to the event exceeds a predetermined threshold. In the example of FIG. 2B, the vehicle V3, V4 and V5 are all located in the vicinity of the event. The server filters out vehicle V5, which is headed a way from the event and therefore needs not be notified about it, and vehicle V4 which TTC with the event is longer than the predetermined threshold. Accordingly, a push notification of the event is only pushed to the data provider module 115 of the device 100 of vehicle V3. In this regards, it should be noted that the data provider module 115 serves as telemetry data provider usable from providing the device 100 which remotely measured data indicative of the driving conditions of the vehicle.

Reference is now made more specifically to FIG. 3A which is a flow chart 200 exemplifying a method of the invention for assisting driver's safety. The method provides for operating a communication device of a driver when driving a vehicle. The method may be implemented by suitable electronic circuitry and/or by software and/or hardware containing computer readable code for executing the methods steps 210 to 270 by a computerized system such as a mobile phone device.

According to this method, driving conditions of the vehicle are continuously monitored by analyzing data obtained from one or more of the following: sensors, a positioning system, and a data network. For example, in 210, input data is obtained. The input data may optionally be obtained in 212 from sensors (e.g. 112-118) measuring parameters internal and/or external to the vehicle, and/or it may optionally be obtained in 214 from a data network (e.g. communication with a central data processing server 150). The data may include for example conditions external and/or internal to the vehicle, weather conditions, traffic conditions, and safety hazards/driving conditions detected by other vehicles.

In 220, the input data from the sensors/network is processed to determine/detect driving conditions and/or safety hazards presenting risk to the vehicle/driver. FIG. 3B is a table exemplifying, in a self explanatory manner, the way of detection of certain types of safety hazards. The safety hazards listed in the table are provided only as an example and it should be understood the in various implementations of the technique of the present invention other types of safety hazards may be considered.

In some embodiments of the present invention, the continuous monitoring of the driving conditions includes carrying out at least one of the following: determining a speed of the vehicle, determining a trajectory of movement of the vehicle, determining acceleration of the vehicle, determining traffic conditions along the vehicle route, determining a distance of the vehicle to at least one object along the vehicle's route, and determining whether the driver of the vehicle is distracted and/or a degree of distractions which may affect the driver's driving capabilities.

Operation 230 includes processing the data indicative of the driving conditions and/or safety hazards to determine a safety level (e.g. degree of safety) of the vehicle. FIG. 3C is a table exemplifying, in a self explanatory manner, the way an overall safety level for the vehicle can be determined from the plurality of detected safety hazards. It should be understood that this table is a non-limiting example and that other conditions/formulas may be set in various implementations of the system to assign a safety level to the vehicle.

Operation 240 includes automatically adjusting an operational mode of a communication device associated with the vehicle/driver based on the safety level determined in 230. The automatic adjustment is directed to automatically enable, disable and/or alter one or more predetermined functions of the communication device of the driver/vehicle in accordance with the safety level. The predetermined functions of the communication device that may be automatically adjusted (enabled/disabled/altered) may for example include one or more of the following functions: receiving and transferring incoming and outgoing phone calls respectively, receiving and transferring incoming and outgoing messages respectively (text, multimedia), and browsing a data network. The ways these functions can be adjusted based on the determined safety levels are illustrated, in self explanatory manner, in the non-limiting example provided in the table of FIG. 3D.

To this end, as indicated above, the safety level determined for the vehicle based on the driving conditions may be selected from a list of predetermined discrete safety levels including: at least one SAFE level, at least one DANGEROUS level, and at least one intermediate level of a predefined degree of safety. The automatically adjustment of the operational mode of the phone may include selectively setting an operational mode of each of said predetermined functions to at least one of the following modes: fully enabled mode, fully disabled mode, voice control mode, read-aloud notification mode; auto-reply mode; emergency action mode.

Figure 3H:
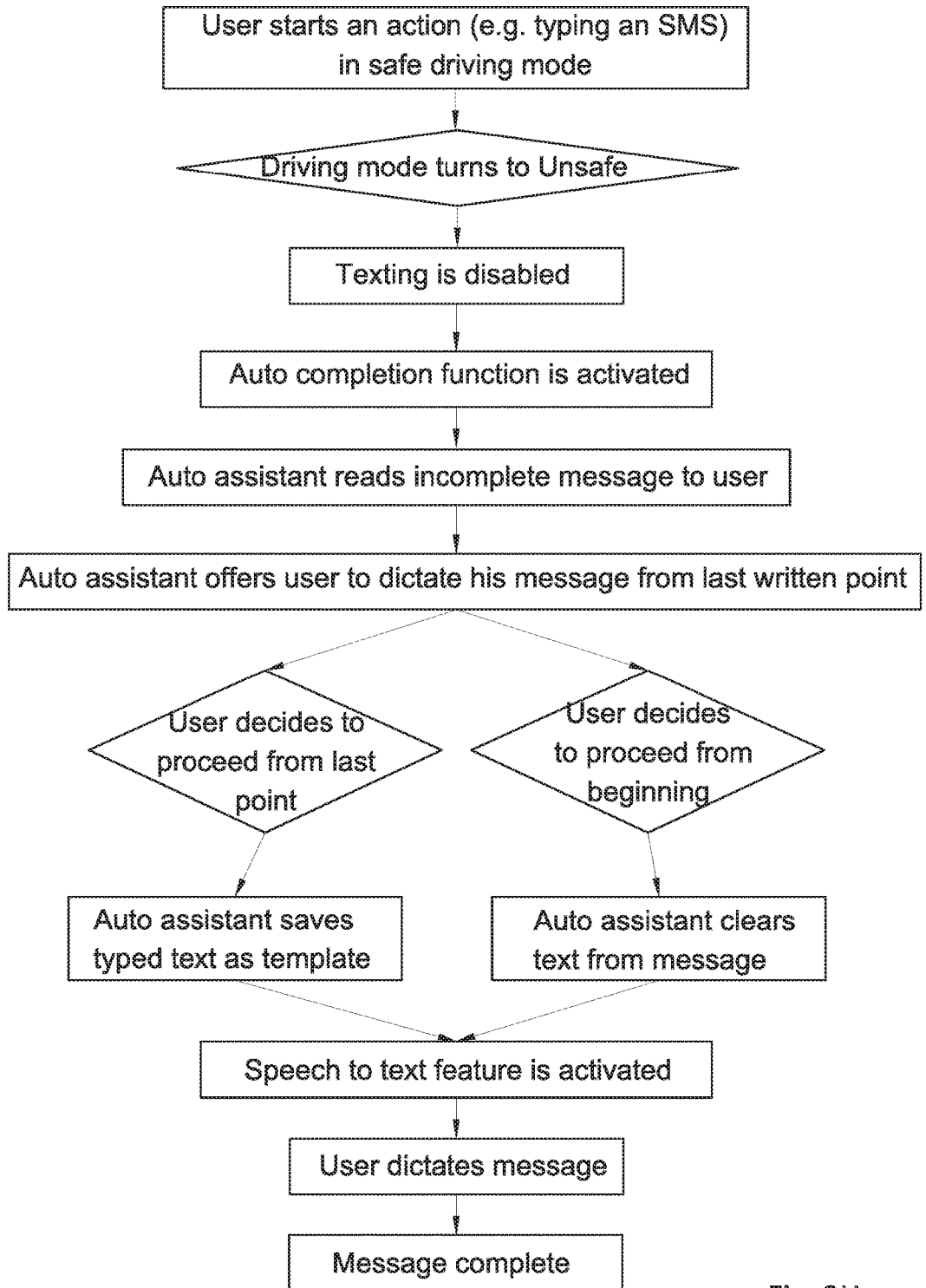
FIG. 3H is a flow chart illustrating in a self explanatory manner a method according to an embodiment of the present invention for real time dynamic adjustment of the operational mode of an interactive communication function of a communication device, such as outgoing SMS texting, when a safety level of the vehicle is changed.

Thus, in certain embodiments of the present invention, the application algorithm continuously determines a driving safety level, using discrete levels such as safe/unsafe/dangerous, and generates an operation signal/data to enable or disable the application functions accordingly. For example, if unsafe or dangerous mode is identified, while the driver replies to an SMS, the application will disable the texting function and display a warning signal that may be visual, audio or physical signal. This is exemplified, in a self explanatory manner in FIG. 3H.

Also, in some embodiments of the invention, for certain predetermined safety levels, messages and notifications are narrated aloud by the device 100, and/or voice commands option of certain applications (e.g. third party applications) is activated (e.g. by utilizing microphones and/or speakers associated with the device 100). Also in some embodiments of the invention, an auto-completion mode may be activated manually or automatically. For example, when a driver types a text message and the device shifts to unsafe mode in the middle of the texting, the user/driver may finish the message either by way of voice command or by way of auto completion function, for example using a predefined common text message. Also the system may further allow the automatic answering of calls from predefined contacts or all contacts when the application is active and the feature is activated.

Thus, operations 230 and 240 provide for automatically adjusting predetermined functions of a driver's communication device in accordance with a safety level of a vehicle. In the following optional operations 250, 260 and 270 are described aimed at assisting the driver based on the monitored driving conditions and detected safety hazards.

In 250, safety indications and alerts are issued/presented to the driver (e.g. in audio/visual ways), so as to alert the driver about the detected hazards. To this end, as indicated above, an image/video showing the road conditions a head may be presented (e.g. as background image) on a display of the communication device 100, wherein risk/hazard presenting objects/elements may be marked and/or emphasized, as illustrated for example in FIG. 3E.

For example, an algorithm may be used to calculate the driving speed of the vehicle and its distance from another object (another vehicle or pedestrian) in front, and warn the driver of the vehicle regarding possible collisions and lane departure. In such cases, the device 100 may be configured to show the detected objects with enlarged presentation in order to emphasize that the detected objects appear to be closer, as exemplified in FIG. 3F. The device of the invention may also detect traffic lights and traffic signs and warn the driver accordingly using warning signals.

As described above, in certain embodiments of the present invention, the communication device 100 includes a display module. Upon determining that the safety level of the vehicle corresponds to a driving state, one or more of the following may be carried out in 250: presenting imagery from at least one forward looking camera as background on the display module; and/or graphically presenting (e.g. by icons) one or more of the predetermined functions that are enabled at said safety level on top of the background; and/or hiding one or more of the predetermined functions that are disabled at that safety level; and/or present/show safety alerts corresponding to detected safety hazards on the display.

To this end, the invention provides a system and method for assisting in driver safety including a non-transitory computer-readable medium storing computer readable code for operating a computerized device (e.g. Smartphone) to carry out the following: communicate with at least one camera to receive therefrom an imagery data (e.g. one or more images/video feed), and display the imagery data as a background layer beneath other visual information displayed on a display of the computerized device, i.e. presenting the augmented image. In some embodiments of the invention, the system is configured to adjust the appearance of certain predetermined software applications running on the computerized device, (e.g. chat application, navigation application, especially GPS) such that they become transparent/semi-transparent when using the device 100, thus providing augmented reality driving experience.

As described above, the computerized device, installed with the communication device of the invention, may be a mobile communication device (e.g. smartphone, tablet etc.) including the camera. The mobile communication device may be placed in the vehicle such that the camera faces and captures imagery of the road in front of a driver, and the imagery is presented on the display of the mobile communication device. This allows the driver to operate the mobile communication device while seeing the road in front on the display. To this end, whenever a driver takes his eyes off the road, the mobile communication device utilizing the invention may allow him to still see the road as the background of the display, and the driver will be apprised of relevant information through real time alerts and assistance. The device of the invention may determine safe and dangerous driving modes and react appropriately, for example by disabling phone functions or providing assistance to the driver.

In certain embodiments of the present invention, the method of operating the driver's communication device includes determining whether the driving conditions/and or safety levels/hazards are associated with an emergency/dangerous level, and in such cases carrying out optional operation 260. In 260, the communication device 100 of the invention may be activated in emergency action mode (e.g. activating emergency functions) to automatically carrying out at least one of the following: operating the driver's communication device for transferring the data indicative of driving conditions to a central station/server 150, transferring image data obtained from at least one sensor, to a central server/station 150, initiating an emergency notification communication to a central station.

Also, as indicated above, in certain embodiments of the present invention operation 270 is carried out to upload data indicative of the driving conditions and/or safety hazards over a data network to the central server/station 250. The central server may process that data to determine information to be provided to other communication systems (100 and/or 100' associated therewith based on their locations and the locations of the detected hazards).

Figure 4A:
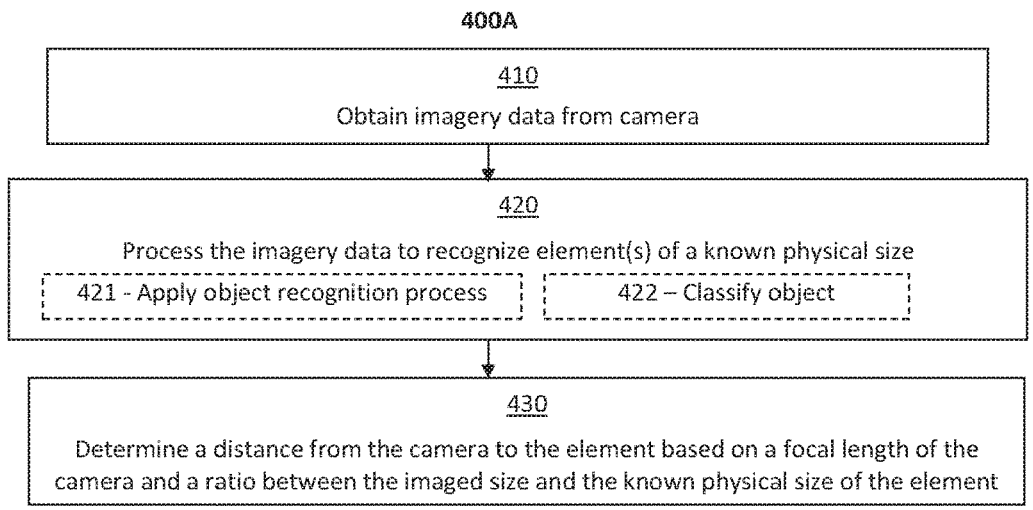
FIG. 4A is a flow chart 400A of a method for determining a distance from a vehicle to another object/vehicle according to an embodiment of the present invention.

Reference is made to FIG. 4A showing a flow chart 400A of an example of a method according to the present invention for determining a distance from a vehicle to another object/vehicle. As indicated above, the method may 400A be used by the device 100 to facilitate use of imagery (images/videos) from a single mono camera for determining a distance towards objects of known type appearing in the imagery (e.g. enabling to determine the distance to objects which are associated with known form-factor parameters such as vehicles, or parts thereof, such as license plates and/or vehicle lights).

Method 400A includes operation 410 for receiving imagery data from a camera. The imagery data may be obtained for example from a camera (e.g. mono, non-stereoscopic) FL camera associated with the vehicle at which device 100 is operated. The camera may be placed and/or operated for capturing an image showing road ahead at which another vehicles and/or other objects may be.

Operation 420 of method 400A includes processing the received imagery (images/video) to recognize an element in the imagery, which are associated with known physical sizes. The elements may be for example elements on the another vehicle presented in the images, such as the license plate of the another vehicle which has typically a standard size, and/or the distance between the headlights/back lights of the vehicle, which size may physical size can be determined by recognizing the type/model of the another vehicles.

In operation 430 of method 400A a distance between the camera and the recognized elements/objects of the known physical size that were recognized in the image is determined by comparing the imaged size of those objects (e.g. their height and widths in the image plane), with their known physical size which was obtained in 420. More specifically, a distance from the camera to the recognized element/object may be determined based on a focal length of the camera and a ratio between said imaged size of the object and its actual physical size.

For example in some embodiments of the present invention the distance to the identified objects/elements is determined by system 100 based on the following relation: object_distance=focal_length*(object_size/object_size_in_image), wherein the object_distance being a measure of an actual physical distance between the camera to the identified object/element; focal_length is the focal lengths of the camera's lens; object_size is the actual physical size of the identified object/elements, object_size_in_image is the size (length/width) of the projection of the object on the image plane of the camera.

Turning back to operation 420, in some embodiments of the present invention operation optionally includes sub operation 421 for carrying out pattern/object recognition processing to identify/recognize various (e.g. predetermined) elements within the captured images (such as license plates, vehicle types/models and/or vehicle lights).

Optionally in certain embodiments of the present invention sub operation 421 includes: (i) applying image recognition processing algorithm to identify predetermined element/s/objects in the image; (ii) applying a tilt correction algorithm to the image to compensate over pitch and yaw misalignments, and generate a compensated image (portion thereof) with the identified element appearing therein, and (iii) measuring the imaged size(s) of the identified elements/objects in the compensated image, with respect to at least one dimension of the elements/objects.

Operation 420 may also optionally include sub operation 422 for classifying the recognized objects to known types/models of objects and determine/obtain data indicative of their sizes. Then, after the recognized objects are classified, the physical size of the objects may be determined, for example by utilizing reference data stored by system 100 and including data indicative of the predetermined physical sizes of various objects that are to be recognized and classified at operation 420.

For example, in certain embodiments classification operation 422 includes determining the imaged size of the recognized object/element with respect to at least two dimensions thereof, an utilizing the data on the size of the imaged size of the object in these at least two dimensions to classify the object to a certain object type/model.

More specifically, in certain embodiments and/or for certain object types/categories, operation 422 may include calculating a ratio between the imaged size of the object/element in these at least two dimensions and utilizing that ratio to classify the element/object to one or more associated known types, and provide the predetermined physical size based on said classification. This technique may be particularly used when a distance to vehicles is determined based on the imaged size of license plate elements/objects of the vehicles. Typically, in each jurisdiction, there are certain standard license plate types/models which are allowed for use, wherein in most cases each of the different license plate types is associated with a different aspect ratio between its height and width. Thus according to the technique of the present invention, operation 422 may include calculating a ratio between the imaged size of the object/element (license plate object) in these two dimensions, and utilizing this ratio to determined, based on a given reference data (e.g. indicative of the sizes of standards license plates), which type of object/license plate is identified in the image and thereby classify the object/license plate recognized in the image to the correct type/model. Accordingly the actual physical size of the recognized object/license-plate may be determined (e.g. from the reference data), and the distance to the vehicle carrying the license plate can be estimated in operation 430.

Figure 4B:
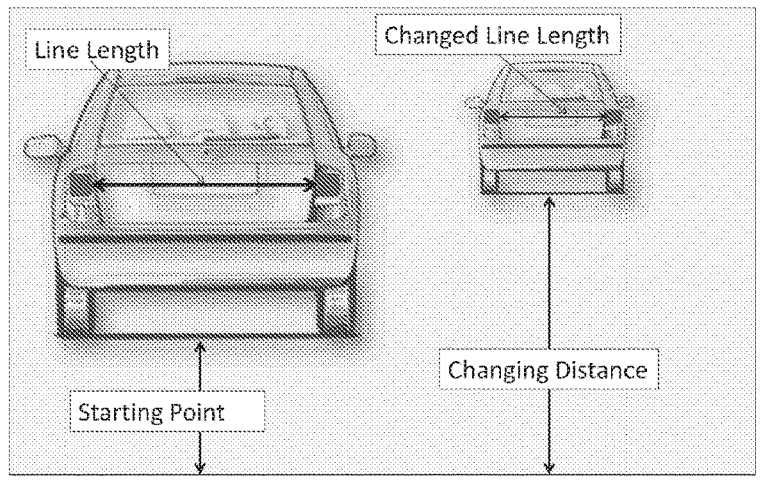
FIGS. 4B and 4C are schematic illustrations exemplifying in a self explanatory manner the operation of the method of FIG. 4A for determining a distance to a vehicle based on imaged sizes of elements on the vehicle having known/predetermined physical sizes.
Figure 4C:
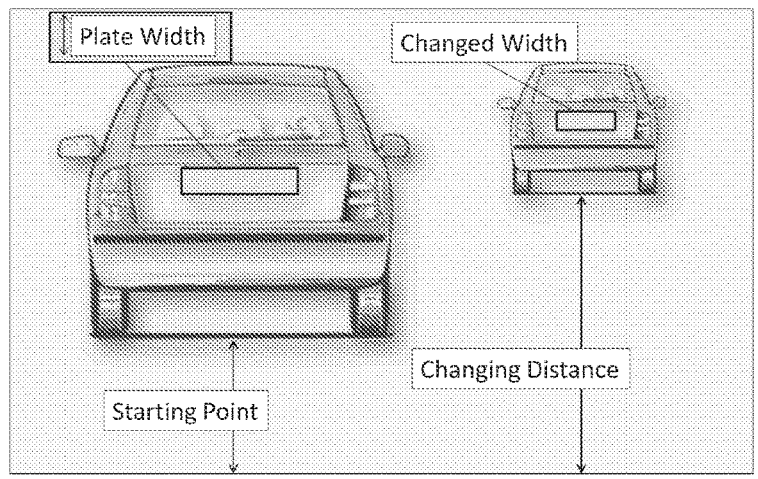

FIGS. 4B and 4C are schematic illustrations showing in a self explanatory manner how the distance to vehicles may be determined based on the imaged sizes of elements of predetermined physical sizes on the vehicles.

In FIG. 4B the identified objects/elements are the pair of back lights of the vehicle, and the dimension/sized that is measured and used to estimate a distance to the vehicle is the distance between the back lights. In 421 the back lights are recognized, and possibly also parameters indicative of the type of the vehicle is identified by the image processing/recognition. In 422 the pair of back lights is classified to the recognized vehicle type and the size of the physical distance separation between them is determined in accordance with the vehicle type. Accordingly, in 430, the distance to the vehicle is estimated based on the thus determined physical distance between the back lights, their respective distance in the image plane, and the focal length of the camera. FIG. 4C, shows a similar example, in which the object/element used to measure the distance to the vehicle is the license plate of the vehicle. As shown, in both these figures, the imaged size of the recognized object gets smaller as they are further away from the camera.

It should be noted that according to the present invention, the usage of license plates and/or vehicle lights to determine distances towards vehicles that appear in the imagery obtained from the camera, has particular advantages. This is because this technique provides effective way to measure distance to vehicles in both bright/day as well as during night/dark conditions, since also in the night conditions the typically the vehicle lights and/or the license plate are typically lit.

Figure 4D:
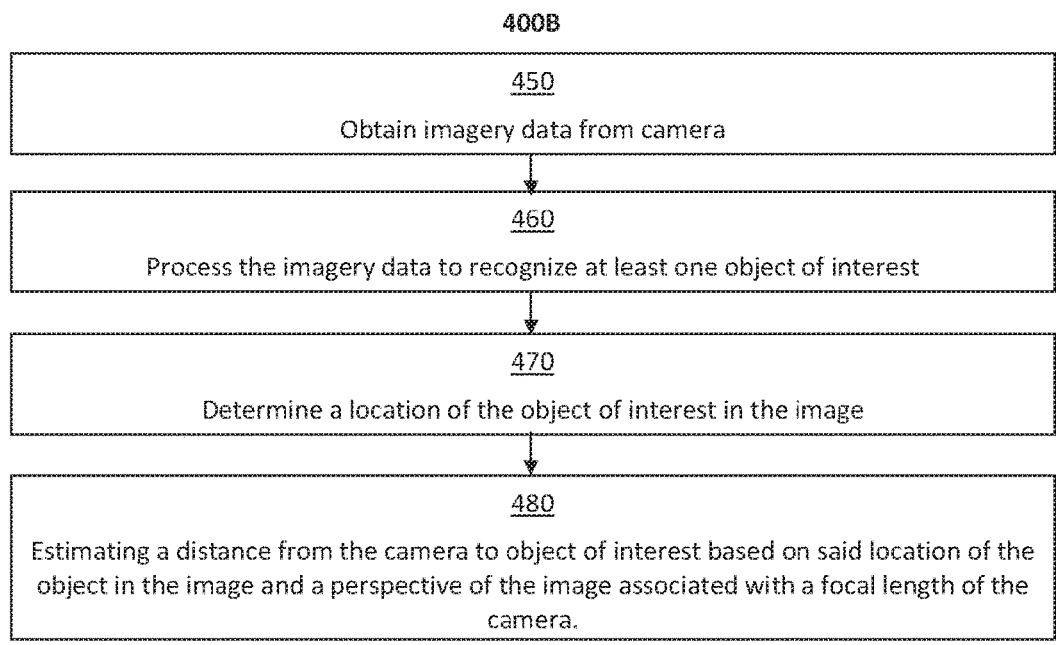
FIG. 4D is a flow chart 400A of another method for determining distance to elements/objects in an image.

Reference is made to FIG. 4D showing another method 400B for determining distance to elements/objects, such as vehicles and pedestrians appearing in images obtained from the camera. The method 400B includes operation 450, which is similar to operation 410 indicated above, and in which imagery is obtained from the camera. The method 400B also includes operation 460, which is similar to operation 420 indicated above, and in which objects/elements in the image are recognized. The objects may be predetermined objects, of which pattern recognition parameters are a priory known and stored/included in the reference data used by the system 100. In operation 470, the locations in the image of the recognized objects/elements, or of at least certain object of interest in the image, are determined Specifically, in some embodiments the height/location of the base line (e.g. the lowest location) at which each of the objects of interest appears in the image, is determined. For example, as may be seen from the self explanatory figure FIG. 4E, the base-line (or the lowest-location) of the appearance of the object in the image may be associated with the virtual line connecting the wheels of a vehicle appearing in the image. Then, in 480 the distance from the camera capturing the imagery to the object of interest is determined/estimated based on the determined location of the object/vehicle in the image (e.g. based on the height of its lowest location/base-line in the image), and a perspective of the captured image. The perspective of the captured image may be determined/estimated in accordance with the focal depth and/or focal lengths of the camera/lens used for capturing the image. Optionally also the camera tilt (e.g. pitch), which may be obtained by from inertia sensors coupled to the camera) may also be used to determine the location of the perspective of the image (e.g. the perspective grid) with improved accuracy.

Figure 4E:
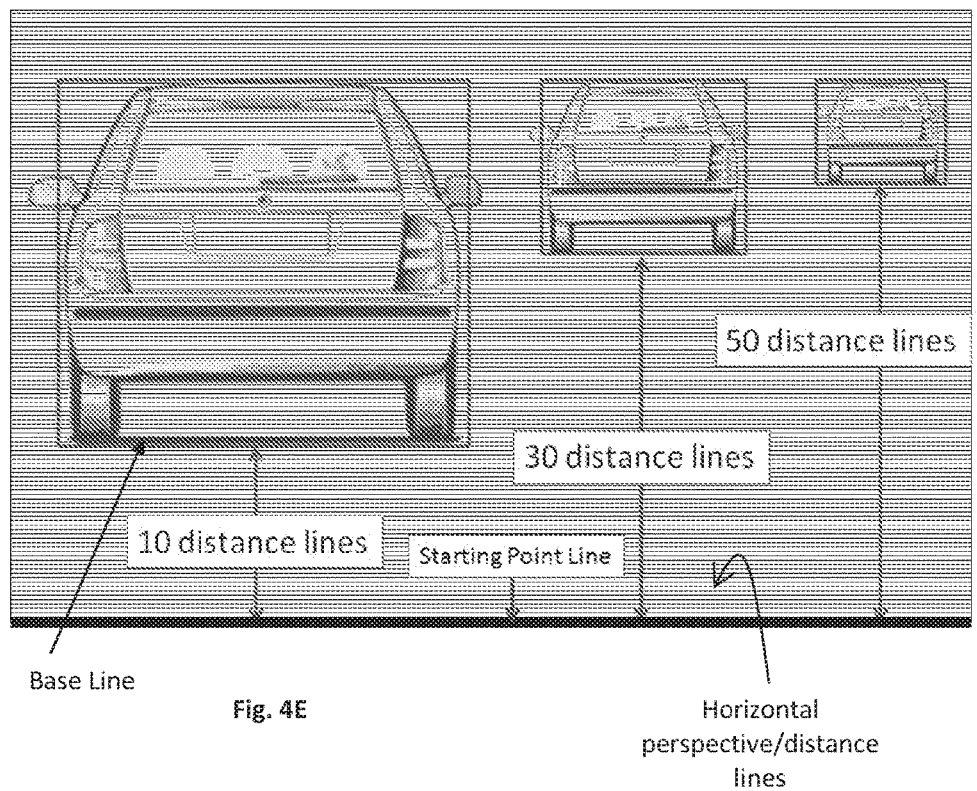
FIG. 4E is schematic illustrations exemplifying in a self explanatory manner the operation of the method of FIG. 4D.

FIG. 4E is a self explanatory example of the implementation of method 400B for estimating a distance to a vehicle identified in an image. Horizontal perspective lines superposed on the image are illustrated. Each perspective line marks a different distance from the camera. The locations of the perspective lines in the image are determined in accordance with the focal length/focal depth of the camera, and possibly also based on the camera tilt. Recognized objects/vehicle located at different distances from the camera are shown to be enclosed by respective box lines marking the boundaries of the recognized objects. The measure of the distance to the recognized objects is determined based on the relative location between the object in the image (e.g. the location of the objects base line, being for example the bottom boundary of the recognized object) and the perspective/distance lines which are "superposed" on the image in accordance with the focal length/focal depth of the camera.

Figure 5:
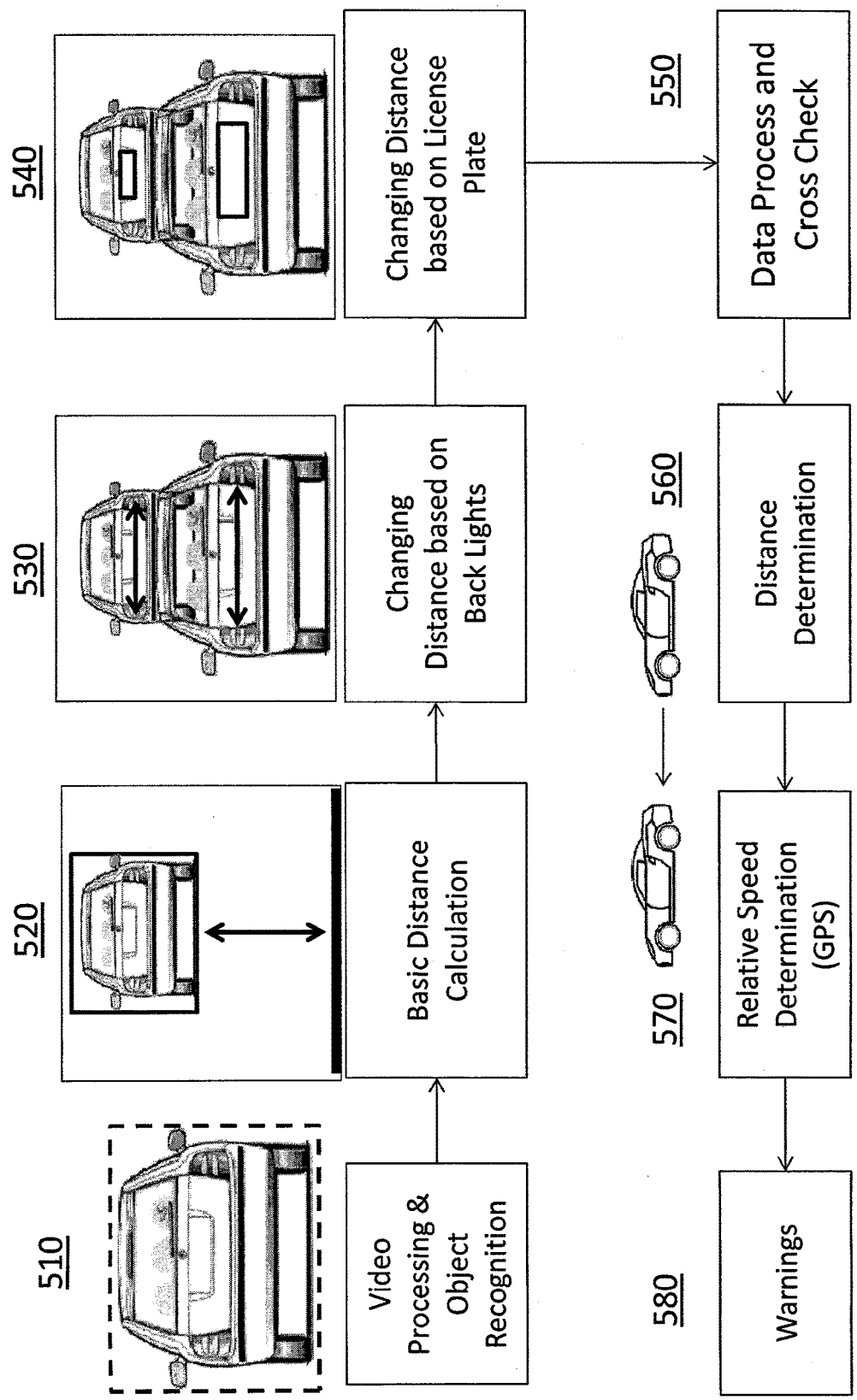
FIG. 5 is schematic illustration of a method for determining a distance between a camera to an object/vehicle appearing in an image photographed by the camera, with improved accuracy by utilizing a combination of the methods of FIGS. 4A and 4D.

FIG. 5 is schematic self explanatory illustration of a method according to the present invention for determining/estimating a distance between a camera to an object/vehicle appearing in an image photographed by the camera. The method depicted here utilizes a combination of the methods 400A and 400B described above with reference to FIGS. 4A to 4E, in order to achieve accurate and distance measurements. Operation 510 is similar to operations 410 and 450 described above and includes recognizing the object/vehicle towards which the distance is to be determined. In operation 520, the method 400B described above is performed on the recognized vehicle/object to estimate its distance from the camera. To this end, the distance may be is estimated based on the location of the base line of the object in the image and the perspective (perspective grid/distance-lines) of the image. In each of the operations 530 and 540 method 400A is executed to determine/estimate the distance between the camera and elements of predetermined physical size on the vehicle/object. In operation 530 the distance to the lights of the vehicle is determined in and 540 the distance to the license plate of the vehicle is determined. Thus in 520-540, at least two (in this example three) separate values indicating the distance to the vehicle in the image are estimated independently by executing methods 400B and 400A. In 550 the values are processed/compared to one another and cross checked to verify that are in agreements, and in 560 the distance to the object is estimated based thereon with improved accuracy.

To this end, in this embodiments the method/algorithm collects values of three different data types indicative if the vehicle's distance from the camera (the distance line on the image perspective grid at which the vehicle is located in the image, distance between lights of the vehicle in the image, and the size (width and/or height) of the license plate of the vehicle), and performs a cross check (triangulation) between these values and determines distance to vehicle with improved accuracy. In case values of only one or two of these only data types are available (e.g. only the perspective grid based distance measurement), then the data is not crossed checked, and might therefore yield less accurate distance estimation techniques than in cases where additional distance estimation techniques are used.

Optional operations 570 and 580 depict that warning may be issued to the driver in case the heading distance of the vehicle in the image is determined to be shorter than the permitted/recommended minimal distance to keep between vehicles. For example, as described above, in 570 the velocity/speed of the vehicle at which the camera/device 100 is placed is determined/obtained with suitable accuracy (e.g. utilizing a GPS module). Then in the minimal distance to keep between vehicles is determined in accordance with the determined speed, and is compared with the estimated distance to the vehicle appearing in the image. In case the estimated distance is shorter than the minimal distance that should be kept, than a short headway distance indication/warning may be issued by the system 100, in the manner described above.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A method for operating a mobile communication device of a driver when driving a vehicle, the method comprises:
monitoring driving conditions by analyzing data obtained from one or more sensors built in said mobile communication device, wherein said sensors comprise at least a camera device of the mobile communication device;
processing data indicative of said driving conditions and determining a safety level of the vehicle corresponding to said driving conditions based on a measured distance; and
automatically adjusting an operational mode of said communication device based on said safety level, to automatically enable, disable and/or alter predetermined functions of said communication device in accordance with said safety level;
wherein said monitoring of the driving conditions comprises:
(i) operating said camera device of the mobile communication device for capturing an image showing at least one object along the vehicle's route:
(ii) processing said image to:
recognize an element on the said object, wherein the recognized element has a predetermined physical size; and
determine an imaged size of the element in said image;
(iii) utilizing reference data to determine the predetermined physical size of said element: and
(iv) determining the measured distance from the camera to said element of the predetermined physical size based on a focal length of the camera and a ratio between said imaged size and said predetermined physical size, and
wherein said determining of said safety level comprises processing the data obtained from the one or more sensors built in said communication device to determine said driving conditions and identify a plurality of safety hazards and compute a safety score based on existence of one or more of said plurality of safety hazards, and utilize said safety score to select said safety level from a plurality of predetermined discrete levels including: at least one safe level, at least one dangerous level, and at least one intermediate level of a predefined degree of safety; and
wherein said automatically adjusting of the operational mode includes selectively setting an operational mode of each of said predetermined functions to at least one of the following modes: fully enabled mode, fully disabled mode, voice control mode, read-aloud notification mode; auto-reply mode; emergency action mode.

2. The method of claim 1, wherein said communication device comprises a display module, and wherein said automatically adjusting the operational mode of said communication device comprises:
upon determining the safety level that corresponds to the driving conditions of said vehicle, carrying out one or more of the following:
presenting imagery from at least one forward looking camera as background on said display module; and
graphically presenting one or more of the predetermined functions that are enabled at said safety level on top of said background; and
hiding one or more of the predetermined functions that are disabled at said safety level.

3. The method of claim 1, wherein said continuously monitoring of the driving conditions comprises operating said sensors built in said communication device to carry out at least one of the following: determining a speed of the vehicle, determining a trajectory of movement of the vehicle, determining acceleration of the vehicle, determining traffic conditions along the vehicle route.

4. The method of claim 3, wherein said at least one object is another vehicle, and
wherein said processing comprising one or more of the following:
applying image recognition algorithm to identify said element in the image;
applying a tilt correction algorithm to said image to compensate over pitch and yaw misalignments, and generate a compensated image in which said element appears;
measuring the imaged size of said element in the compensated image, with respect to at least one dimension of the element; and
wherein said determining of the distance from the camera to said element based on said predetermined physical size comprises utilizing the following relation:

object distance=focal length*(object size/object size in image).

5. The method of claim 4, wherein said element includes a license plate of said another vehicle, or a pair of lights of said another vehicle.

6. The method of claim 1, comprising determining said predetermined size of the said element by carrying out the following:
processing said image to determine the imaged size of said element with respect to at least two dimensions thereof, and calculating a ratio between them; and
utilizing said ratio to classify said element to one or more associated known types, and provide said predetermined physical size based on said classification.

7. The method of claim 1, wherein the determining of the distance to the at least one object further comprises:
operating said camera of the communication device for capturing an image showing said at least one object;
processing said image to recognize said at least one object and determine a location thereof in the image; and
estimating a distance to said at least one object based on said determined location in the image, and a perspective of said image associated with a focal length of said camera by which said image is captured.

8. The method of claim 1, wherein said object is another vehicle and wherein the method further comprises determining whether said distance is below a certain minimum safe distance between said vehicle and said another vehicle by carrying out the following: obtaining data indicative of a velocity of said another vehicle, and determining said minimum safe distance by multiplying said velocity by a certain predetermined minimal time value.

9. The method of claim 1, further comprising determining that an unsafe driving condition exists based on a change in the measured distance.

10. The method of claim 1, wherein said predetermined functions include at least one of the following interactive communication functions:
receiving and transferring incoming and outgoing phone calls respectively, receiving and transferring incoming and outgoing texting messages respectively, and browsing a data network.

11. An application installable on a mobile communication device preprogrammed for performing predetermined functions, said application is configured for assisting in safe driving of a vehicle, and for receiving input data from sensors built in said communication device including at least one camera device and comprising a data processor utility, the data processor utility comprising:
a driving condition module configured for processing said input data obtained from said sensors built in said mobile communication device to determine driving conditions of said vehicle;
a safety hazard detection module adapted for processing data indicative of said driving conditions to determine a safety level of the vehicle corresponding to said driving conditions based on a measured distance; and
wherein said driving condition module is configured to determine a distance of the vehicle to at least one object along the vehicle's route by carrying out the following:
(i) operating the camera device for capturing an image showing the at least one object along the vehicle's route:
(ii) processing the image to:
recognize an element on the said object, wherein the recognized element having a predetermined physical size;
determine an imaged size of the element in said image;
(iii) utilizing reference data to determine the predetermined physical size of said element; and
(iv) determining the measured distance from the camera to said element of the predetermined physical size based on a focal length of the camera and a ratio between said imaged size and said predetermined physical size, and
wherein said safety hazard detection module is configured to:
determine said safety level by processing the data obtained from the one or more sensors built in said communication device to determine said driving conditions,
identify a plurality of safety hazards in said driving conditions,
compute a safety score for said driving conditions based on existence of one or more of said plurality of safety hazards, and
utilize said safety score to selected said safety level from a plurality of predetermined discrete levels including: at least one safe level, at least one dangerous level, and at least one intermediate level of a predefined degree of safety; and
wherein said application is configured to automatically adjust an operational mode of said communication device based on said safety level, to automatically enable, disable and/or alter predetermined functions of said communication device in accordance with said safety level;
wherein said predetermined functions include at least one of the following: receiving and transferring incoming and outgoing phone calls respectively, receiving and transferring incoming and outgoing texting messages respectively, and browsing a data network; and said automatically adjusting of the operational mode includes selectively setting an operational mode of each of said predetermined functions to at least one of the following modes: fully enabled mode, fully disabled mode, voice control mode, read-aloud notification mode; auto-reply mode; emergency action mode.

12. The application of claim 11, comprising a data provider module adapted for downloading a computer readable code from a data network, wherein said computer readable code implementing said driving condition module, and said safety hazard detection module.

13. The application of claim 12, wherein said personal communication device is a mobile phone device and wherein said sensors include one or more of the following: a positioning system, a camera capable of operating in forward facing mode, a camera configured to operate in rear facing mode, at least one acoustic receiver, a data provider module configured to communicate with a central station via a communication network, one or more inertial measurement modules.

14. The application of claim 11, comprising a user interface (UI) control module configured and operable for performing automatic adjustment of an operational mode of said communication device based on said safety level, by carrying out one or more of the following, upon determining the safety level that corresponds to the driving conditions of said vehicle:
   presenting, on the user interface, imagery from at least one forward looking camera as background on said display module; and
   graphically presenting, on a user interface, one or more predetermined functions that are enabled at said safety level on top of said background; and hiding one or more predetermined functions that are disabled at said safety level.

15. The application of claim 11, comprising an emergency control module is configured for operating the mobile communication device in an emergency action mode, by carrying out at least one of the following: transferring the data indicative of driving conditions to a central station, transferring image data obtained from at least one sensor, to a central station, initiating an emergency notification communication to a central station.

16. The application of claim 11, wherein said driving condition module is configured for processing said input data from the one or more sensors built in said communication device to carry out at least one of the following:
   determine a speed of the vehicle, determine a trajectory of movement of the vehicle,
   determine acceleration of the vehicle, determine traffic conditions along the vehicle.

17. The application of claim 11, wherein said at least one object being another vehicle, and wherein said processing of the image includes at least one of the following:
   applying image recognition algorithm to identify said element in the image;
   applying a tilt correction algorithm to said image to compensate over pitch and yaw misalignments, and generate a compensated image in which said element appears;
   measuring the imaged size of said element in the compensated image, with respect to at least one dimension of the element; and
   wherein said determining the distance from the camera to said element based on said predetermined physical size comprises utilizing the following relation:

object distance=focal length*(object size/object size in image).

18. The application of claim 11, wherein said driving condition module is configured for determining the predetermined physical size of the element by carrying out the following:
   processing said image to determine the imaged size of said element with respect to at least two dimensions thereof, and calculating a ratio between them; and
   utilizing said ratio to classify said element to one or more associated known types; and
   providing said predetermined physical size based on said classification.

19. The application of claim 11, wherein said driving condition module is further configured to carry out the following:
   operating the camera for capturing an image showing said at least one object;
   processing said image to recognize said at least one object and determine a location thereof in the image; and
   estimating a distance to said at least one object based on said determined location in the image, and a perspective of said image associated with a focal length of said camera by which said image is captured.

20. A telemetric system including at least one computerized server system configured and operable to communicate with the application for assisting in safe driving of a vehicle according to claim 11, being installed on at least one communication device, being members of the telemetric system, for carrying out the following:
   obtain data indicative of driving conditions and/or safety hazards identified by one or more sensors integrated in the at least one communication device, wherein said data comprises at least said distance between the vehicle to at least one object along the vehicle's route;
   process the data and identify safety hazards which may affect vehicles located in the vicinity of the at least one communication device;
   obtain positioning data from a positioning system of the at least one communication device and from positioning systems of one or more additional communication devices being members of the telemetric system, and process said positioning data to identify another communication device being in the vicinity of the at least one communication device; and
   communicate data indicative of the identified safety hazards to the another communication device.

21. The application of claim 11, wherein said driving condition module is further configured to determine that an unsafe driving condition exists based on a change in the measured distance.

* * * * *